US009575653B2

(12) United States Patent
Barkway

(10) Patent No.: US 9,575,653 B2
(45) Date of Patent: Feb. 21, 2017

(54) ENHANCED DISPLAY OF INTERACTIVE ELEMENTS IN A BROWSER

(71) Applicant: BlackBerry Limited, Waterloo (CA)

(72) Inventor: Michael Ian Barkway, Cambridge (GB)

(73) Assignee: BlackBerry Limited, Waterloo (CA)

( * ) Notice: Subject to any disclaimer, the term of this patent is extended or adjusted under 35 U.S.C. 154(b) by 311 days.

(21) Appl. No.: 13/742,036

(22) Filed: Jan. 15, 2013

(65) Prior Publication Data

US 2014/0198055 A1  Jul. 17, 2014

(51) Int. Cl.
G06F 3/041 (2006.01)
G06F 3/0488 (2013.01)

(52) U.S. Cl.
CPC . G06F 3/04883 (2013.01); *G06F 2203/04805* (2013.01)

(58) Field of Classification Search
CPC .......... G06F 3/04883; G06F 2203/04805; G06F 2203/04808; G06F 3/0481; G06F 3/0482; G06F 3/0488; G06F 3/04842; G06F 3/0236; G06F 3/0418
See application file for complete search history.

(56) References Cited

U.S. PATENT DOCUMENTS

| 6,961,912 | B2 | 11/2005 | Aoki et al. |
| 7,075,512 | B1 | 7/2006 | Fabre et al. |
| 7,076,743 | B2 | 7/2006 | Ingram et al. |
| 7,305,242 | B2 | 12/2007 | Zakharia et al. |
| 7,653,883 | B2 | 1/2010 | Hotelling et al. |
| 7,760,187 | B2 | 7/2010 | Kennedy |
| 7,889,184 | B2 | 2/2011 | Blumenberg et al. |
| 8,077,153 | B2 | 12/2011 | Benko et al. |
| 8,112,705 | B2 | 2/2012 | Day et al. |
| 2008/0259041 | A1* | 10/2008 | Blumenberg ....... G06F 3/04842 345/173 |
| 2009/0064047 | A1 | 3/2009 | Shim et al. |
| 2009/0128505 | A1 | 5/2009 | Partridge et al. |
| 2009/0135132 | A1 | 5/2009 | Huang et al. |
| 2009/0172560 | A1 | 7/2009 | Cole et al. |

(Continued)

OTHER PUBLICATIONS

Opera Software, "Opera Mini 7.0.3 for iOS", posted Feb. 27, 2012, downloaded from Internet URL: [http://my.opera.com/community/forums/topic.dml?id=1316462&t=1345] on Aug. 21, 2012, pp. 1-20.

(Continued)

*Primary Examiner* — Dwayne Bost
*Assistant Examiner* — Robert Michaud
(74) *Attorney, Agent, or Firm* — Rowand LLP

(57) ABSTRACT

A method, system and electronic device are provided for processing touch inputs on a touchscreen display. A starting touch input is detected on a document displayed at an initial scale on the touchscreen. If the starting touch input is within a disambiguation region for a number of interactive elements in the document, while contact is maintained on the display a further view of the document at an enlarged scale is displayed showing the area of the touch input. When an ending touch input is detected, one interactive element may be selected according to the location of the ending touch input, and an interaction function, such as requesting a resource hyperlinked by the selected interactive element, is automatically initiated.

18 Claims, 12 Drawing Sheets

(56) References Cited

U.S. PATENT DOCUMENTS

| | | | |
|---|---|---|---|
| 2010/0066694 A1* | 3/2010 | Jonsdottir | G06F 3/0236 |
| | | | 345/173 |
| 2010/0169766 A1 | 7/2010 | Duarte et al. | |
| 2011/0191014 A1 | 8/2011 | Feng et al. | |
| 2011/0197116 A1 | 8/2011 | Kim et al. | |
| 2013/0328788 A1* | 12/2013 | Wibbeler | G06F 3/0488 |
| | | | 345/173 |
| 2014/0026097 A1* | 1/2014 | Crohas | G06F 3/04883 |
| | | | 715/810 |

OTHER PUBLICATIONS

Xu, W., Yu, C., Shi, Y., "RegionalSliding: Enhancing Target Selection on Touchscreen-Based Mobile Devices", CHI 2011, May 7-12, 2011, Vancouver, BC, Canada. ACM 978-1-4503-0268-5/11/05. Downloaded from Internet URL: [http://pi.cs.tsinghua.edu.cn/publications/2011/Enhancing%20Target%20Selection.pdf] on Sep. 5, 2012, pp. 1-6.

Microsoft Corporation, "Make items on the screen appear bigger (Magnifier)", published at least as early as Aug. 24, 2012, downloaded from Internet URL: [http://windows.microsoft.com/en-US/windows7/Make-items-on-the-screen-appear-bigger-Magnifier] on Jan. 11, 2013, pp. 1-3.

Peddie, G., "Windows 7, Multi Touch, and Magnifier", Aug. 19, 2010, downloaded from Internet URL: [http://forum.tabletpcreview.com/microsoft-windows-7/34430-windows-7-multi-touch-magnifier.html] on Jan. 11, 2013, pp. 1-5.

\* cited by examiner

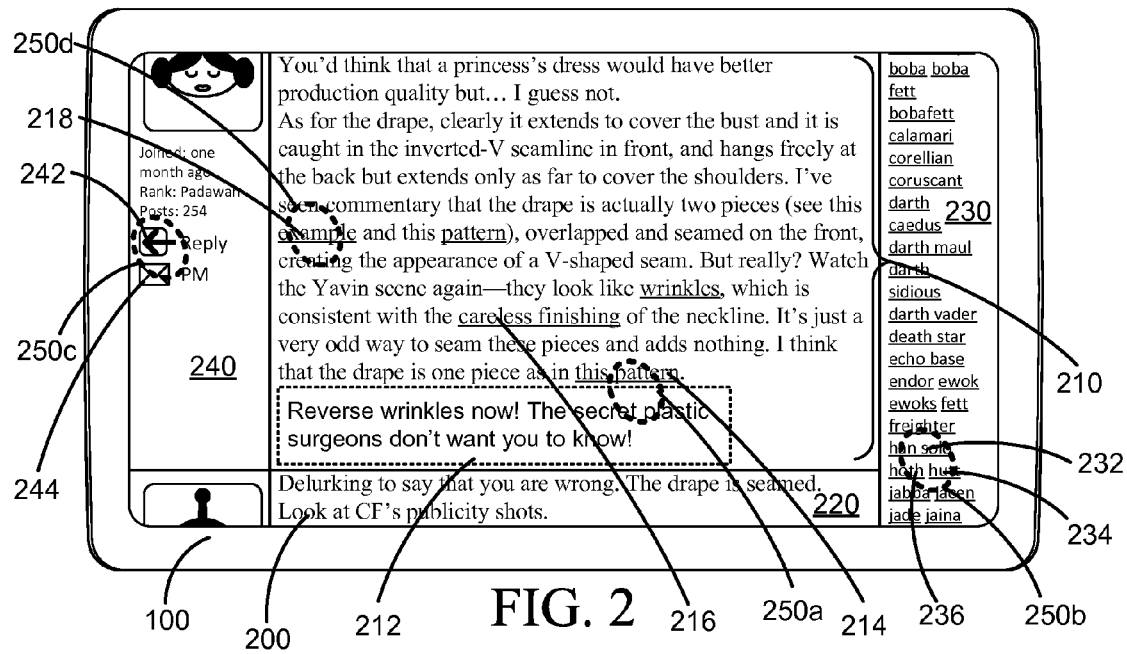
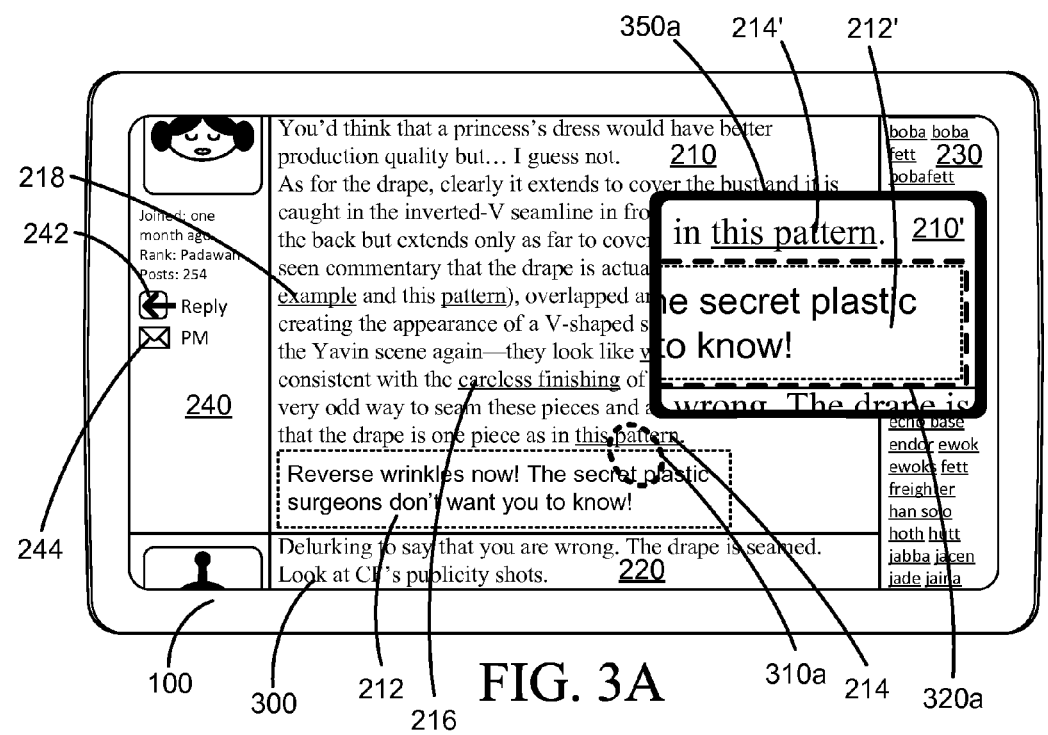

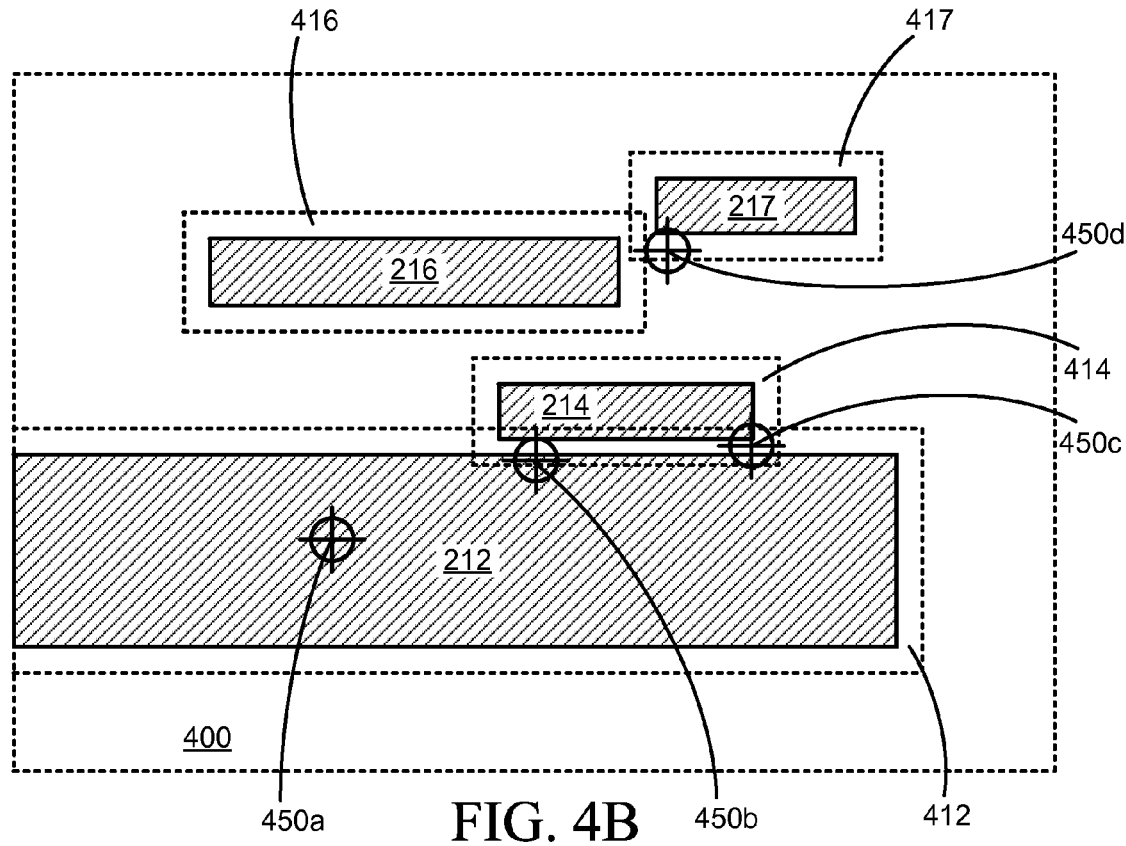

ENHANCED DISPLAY OF INTERACTIVE ELEMENTS IN A BROWSER

TECHNICAL FIELD

The present disclosure relates to rendering and display of interactive elements, such as hyperlinks, in a browser or other viewer application implemented on a touchscreen device.

TECHNICAL BACKGROUND

Web browsers, word processors, e-book readers, file viewers and similar applications are used to present structured documents, webpages, HTML files, and the like, for display by an electronic device. Such documents, and in particular webpages and HTML files, often contain interactive elements such as hyperlinks or controls. When such documents are rendered for display by an electronic device, these elements may be rendered and presented onscreen in a size too small to be considered legible by a user, or too small to be easily manipulated by the user using an input device such as a pointing device or touchscreen interface. This is particularly the case with electronic devices such as tablet computers, smartphones, and some netbooks and laptop computers, which are typically equipped with smaller display screens than desktop computers or similar computing units. When the electronic device's display screen is combined with a touchscreen interface, with a smaller display screen size the interactive elements that the user wishes to select or activate by touch may be obscured by the user's finger, stylus or other implement used to interact with the touchscreen. The result is that the user may not select the intended element, but a nearby one instead, resulting in an incorrect response from the electronic device according to the user's expectations, and additional consumption of overhead processing as the electronic device executes unintended instructions.

BRIEF DESCRIPTION OF THE DRAWINGS

In drawings which illustrate by way of example only embodiments of the present disclosure, in which like reference numerals describe similar items throughout the various figures.

FIG. 2 is an illustration of an example view of a displayed webpage with interactive elements on a touchscreen device.

FIGS. 3A to 3C are illustrations of examples of an enhanced view of the webpage of FIG. 2 in a first implementation.

FIG. 4A is an illustration of an excerpt of the webpage of FIG. 2 with a subset of interactive elements.

FIG. 4B is a schematic diagram of the webpage excerpt of FIG. 4A including disambiguation regions for the interactive elements.

DETAILED DESCRIPTION OF THE INVENTION

Figure 1:
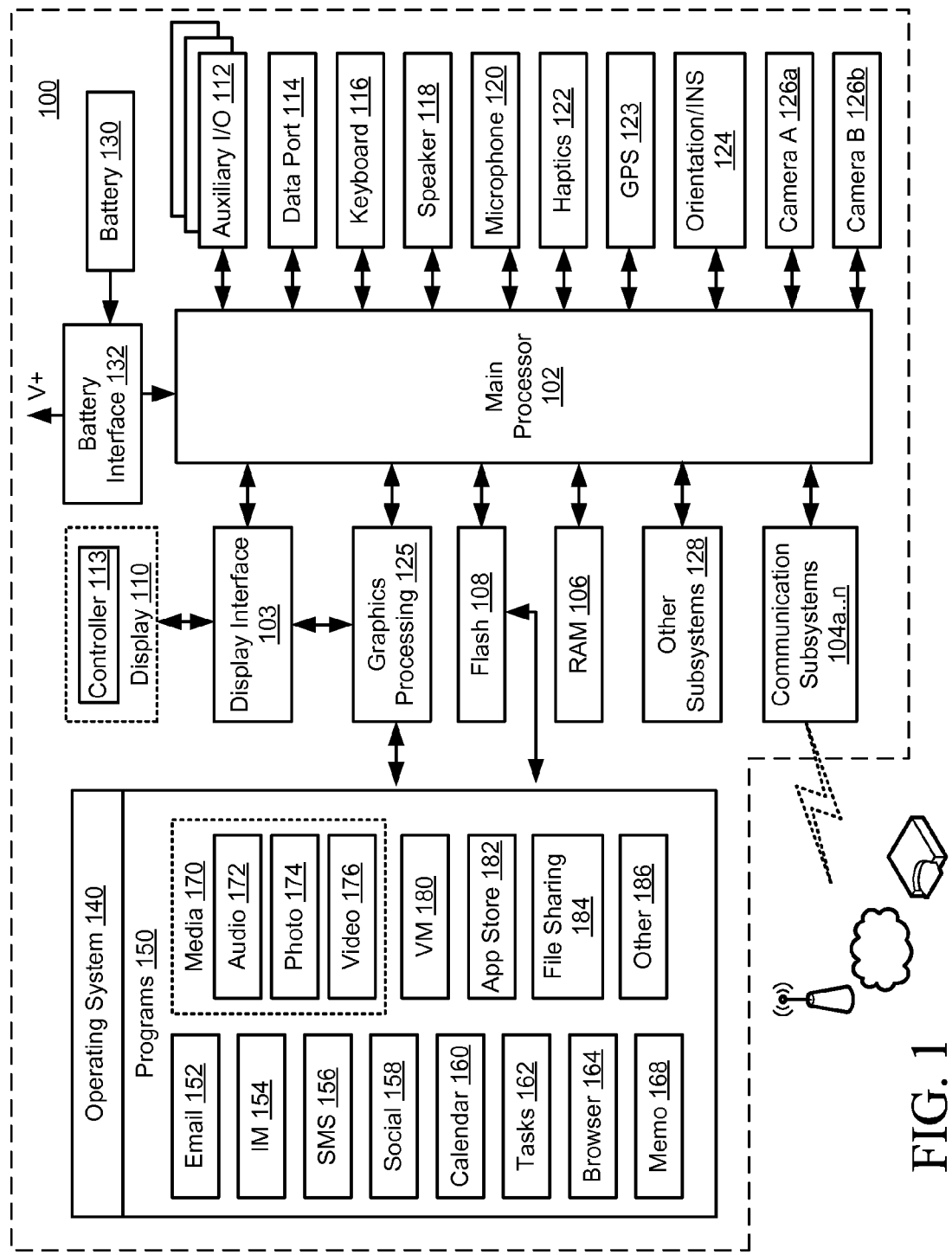
FIG. 1 is a block diagram of an example of an electronic device.

The embodiments and examples described herein provide a device, system and methods for improved reception of input—mainly touch input—selecting an interactive element for initiating an interactive element. These embodiments are described and illustrated primarily in relation to mobile electronic devices, such as tablet computers and smartphones, but can be implemented with any other suitable electronic device provided with appropriate user interface mechanisms as will be understood by those skilled in the art from the following description. It will be appreciated by those skilled in the art, however, that this description is not intended to limit the scope of the described embodiments to implementation on mobile or portable devices, or on tablets or smartphones in particular. For example, the methods and systems described herein may be applied to any appropriate communication device or data processing device adapted with suitable user interface mechanisms, whether or not the device is adapted to communicate with another communication or data processing device using a network communication interface adapted to communicate over a fixed or wireless connection, whether provided with voice communication capabilities or not, and whether portable or not. The device may be additionally or alternatively adapted to process data and carry out operations on data in response to user commands for any number of purposes, including productivity and entertainment. Therefore, the examples described herein may be implemented in whole or in part on electronic devices including without limitation cellular phones, smartphones, wireless organizers, personal digital assistants, desktop computers, terminals, netbooks, laptops, tablets, e-book readers, handheld wireless communication devices, notebook computers, portable gaming devices, tabletop displays, Internet-connected televisions, set-top boxes, digital picture frames, digital cameras, in-vehicle entertainment systems, entertainment devices such as MP3 or video players, and the like.

In the primary examples described herein, the electronic device includes an integrated touchscreen display; however, it will be readily understood by those skilled in the art that an integrated touchscreen display is not necessary for all examples discussed below. In some cases, the touchscreen display may be external to the electronic device casing. In other cases, the electronic device may have an integrated or external display screen but not be touchscreen-enabled. In still other cases, the electronic device may have an integrated display (touchscreen or not), but can also be configured to output data to be painted to an external display unit such as an external monitor or display panel, tablet, television screen, projector, or virtual retinal display (via a data port or transmitter, such as a Bluetooth® transceiver, USB port, HDMI port, DVI port, and the like), the external monitor or display panel being touchscreen-enabled (or not). References herein to a "display," "display screen", "display panel", "display interface" and the like are intended to encompass both integrated and external display units.

FIG. 1 is a block diagram of an example of an electronic device 100, such as those discussed above, that may be used with the embodiments described herein. It should be understood that the components described in FIG. 1 are optional and that an electronic device used with various embodiments described herein may include or omit components described in relation to FIG. 1. The electronic device 100 includes a number of components such as a main processor 102 that controls the device's overall operation. Other processors or components can be included for functions not explicitly detailed herein, such as power management and conversion, encoding and decoding of audio and other data, and the like. Those skilled in the part will appreciate that such components, if present, are not illustrated here for ease of exposition.

The electronic device 100 may be a battery-powered device, having a battery interface 132 for receiving one or more batteries 130. Alternatively or additionally, the electronic device 100 may be provided with an external power supply (e.g., mains power, using a suitable adapter as necessary). If configured for communication functions, such as data or voice communications, one or more communication subsystems 104a to 104n in communication with the processor are included. Data received by the electronic device 100 can be received via one of these subsystems and decompressed and/or decrypted as necessary using techniques and components known to persons of skill in the art. The communication subsystems 104a to 104n typically include a receiver, transmitter, and associated components such as one or more embedded or internal antenna elements, local oscillators, and a digital signal processor in communication with the transmitter and receiver. The particular design of the communication subsystems 104a to 104n is dependent upon the communication network with which the subsystem is intended to operate.

For example, data may be communicated to and from the electronic device 100 using a wireless communication subsystem 104a over a wireless network. In this example, the wireless communication subsystem 104a is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the wireless communication subsystem 104a with the wireless network represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 104b or a short-range and/or near-field communications subsystem 104c. The WLAN communication subsystem 104b may operate in accordance with a known network protocol such as one or more of the 802.11™ family of standards developed or maintained by IEEE. The communications subsystems 104b and 104c provide for communication between the electronic device 100 and different systems or devices without the use of the wireless network, over varying distances that may be less than the distance over which the communication subsystem 104a can communicate with the wireless network. The subsystem 104c can include an infrared device and associated circuits and/or other components for short-range or near-field communication.

It should be understood that integration of any of the communication subsystems 104a to 104n within the device chassis itself is optional. Alternatively, one or more of the communication subsystem may be provided by a dongle or other peripheral device (not shown) connected to the electronic device 100, either wirelessly or by a fixed connection (for example, by a USB port) to provide the electronic device 100 with wireless communication capabilities. If provided onboard the electronic device 100, the communication subsystems 104a to 104n may be separate from, or integrated with, each other.

The main processor 102 also interacts with additional subsystems (if present), the general configuration and implementation of which will be known to those skilled in the art, such as a Random Access Memory (RAM) 106, a flash memory or other memory providing persistent storage 108, a display interface 103 and optionally a display 110, other data and memory access interfaces such as a visualization (graphics) processor 125, auxiliary input/output systems 112, one or more data ports 114, a keyboard 116, speaker 118, microphone 120, haptics module 122 (e.g., a driver and a vibratory component, such as a motor), GPS or other location tracking module 123, orientation and/or inertial navigation system (INS) module 124, one or more cameras, indicated at 126a and 126b and other subsystems 128. In some cases, zero, one or more of each of these various subsystems may be provided, and some subsystem functions may be provided by software, hardware, or a combination of both. For example, a physical keyboard 116 may not be provided integrated with the device 100; instead a virtual keyboard may be implemented for those devices 100 bearing touch screens, using software components executing at the device. Additional display interfaces 103 or displays 110 may be provided, as well as additional dedicated processors besides the visualization processor 125 to execute computations that would otherwise be executed by the host processor 102. Additional memory or storage modules, not shown in FIG. 1, may also be provided for storing data, which can contain flash memory modules as well. Examples include non-volatile memory cards such in the microSD and miniSD formats defined by the SD Association, San Ramon, Calif. Such storage modules may communicate with the mobile device 100 using a fixed or wireless connection.

A visualization (graphics) processor or module 125 may be included in the electronic device 100. The visualization module 125 analyzes and processes data for presentation via the display interface 103 and display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102. Rendered data for painting to the display is provided to the display 110 (whether the display 110 is external to the device 100, or integrated) via the display interface 103.

Content that is rendered for display may be obtained from a document such as a message, word processor document, webpage, or similar file, which is either obtained from memory at the device such as flash memory 108 or RAM 106, or obtained over a network connection. A suitable application, such as a messaging application, viewer application, or browser application, or other suitable application, can process and render the document for display in accordance with any formatting or stylistic directives included with the document. FIG. 1 illustrates possible components of the device 100, such as the operating system 140 and programs 150, which can include zero, one or more applications such as those depicted. Other software components 186 besides those explicitly illustrated in FIG. 1 can also be included, as is well known to those skilled in the art. Programs 150 may be installed on the device 100 during its manufacture or together with loading of the operating system 140, or at a subsequent time once the device 100 is delivered to the user. These software applications may be supplied by the device manufacturer or operating system provider, or may be third party applications. The additional applications can be loaded onto the device 100 through at least one of the communications subsystems 104a to 104n, the data port 114, or any other suitable device subsystem 128.

Example applications include an email messaging application 152, as well as other types of messaging applications for instant messaging (IM) 154 and Short Message Service (SMS) 156). Other applications for messaging can be included as well, and multiple applications for each type of message format may be loaded onto the device 100; there may be, for example, multiple email messaging applications 152 and multiple instant messaging applications 154, each associated with a different user account or server. Alternatively different applications may be provided to access the same set of messages or message types; for example, a unified message box function or application may be provided on the device 100 that lists messages received at and/or sent from the device, regardless of message format or messaging account. Unified messaging or unified inbox applications and functions are discussed in further detail below. Other applications include social networking applications 158, which may provide messaging function, a content reader function, or both; browser applications 164; calendar applications 160, task applications 162 and memo applications 168, which may permit the user of the device 100 to create or receive files or data items for use in personal organization; media applications 170, which can include separate components for playback, recording and/or editing of audio files 172 (including playlists), photographs 174, and video files 176; virtual machines 180, which when executing provide discrete runtime environments for other code on the device 100; "app store" applications 182 for accessing vendor sites offering software applications for download (and optionally for purchase) to the device 100; direct or peer-to-peer file sharing or synchronization applications 184 for managing transfer of files between the device 100 and another device or server such as a synchronization or hosting service, using any suitable protocol; and other applications 186. Applications may store data in the device's file system; however, a dedicated data store or data structure may be defined for each application.

In some examples, the electronic device 100 may be a touchscreen-based device, in which the display 110 includes a touchscreen interface that provides both a display visual presentation of data and graphical user interfaces, and an input subsystem for detecting user input via a graphical user interface presented on the display 110 that may be converted to instructions for execution by the device 100. A display 110 that is a touchscreen may be the principal user interface provided on the electronic device 100, in which case other user input mechanisms such as the keyboard 116 may not be present, although in some examples, a keyboard 116 and/or additional buttons, a trackpad or other user interface mechanisms may still be provided.

Generally, user interface (UI) mechanisms may be implemented at the electronic device 100 as hardware, software, or a combination of both hardware and software. Graphical user interfaces (GUIs), mentioned above, are implemented using the display interface 103 and display 100 and corresponding software executed at the device. Touch UIs are implemented using a touch sensing mechanism, such as the aforementioned trackpad and/or touchscreen interface, along with appropriate software used to convert touch information to signals or instructions. A voice or speech UI can be implemented using the microphone 120, together with modules implemented in hardware or software operable to detect speech patterns or other sounds, and to decode or correlate detected sounds to user commands. A tracking (e.g., eye-tracking or facial tracking) UI or perceptual UI can be implemented using the camera 126a and/or 126b, again with appropriate hardware and/or software modules to analyze received visual data to detect the presence or position of a user's face or eyes, which are used to derive commands or contextual information to control device operations. A kinetic UI can be implemented using the device's orientation/INS module 124, or using the GPS module 123 or another locating technology module, together with appropriate software and/or hardware modules to detect the motion or position of the electronic device 100, again to derive commands or contextual information to control the device. Generally, the implementation of touch, voice, tracking/perceptual, and kinetic UIs will be understood by those skilled in the art.

In touchscreen embodiments, the display controller 113 and/or the processor 102 may detect a touch by any suitable contact member on the touch-sensitive display interface 110 (references to the "display 110" herein include a touchscreen display, for those electronic devices implemented with touchscreen interfaces). The configuration of the touchscreen display and display controller for detecting touches will be known to those skilled in the art. As only one example, the touchscreen display may be a capacitive touchscreen display with a capacitive touch-sensitive overlay having multiple layers including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). Optionally, haptic or tactile feedback can be provided by the haptics module 122 in response to detected touches received through the touchscreen display, either through the housing of the device 100, or through the touchscreen itself. The touchscreen sensors may be capable of detecting and supporting single-touch, mufti-touch, or both single and mufti-touch actions such as tap, double-tap, tap and hold, tap and drag, scroll, press, flick and pinch. A touchscreen enabled to detect only single-touch input is able to accurately identify only one point of contact on the display at a time. A mufti-touch touchscreen is able to accurately identify two or more simultaneous contacts on the screen. The touchscreen display 110 detects these single and mufti-touch actions, for example through the generation of a signal or signals in response to a detected contact, which may then be processed by the processor 102 or by an additional processor or processors in the device 100 to determine attributes of the touch event, such as the location of the touch action, whether defined by horizontal and vertical screen position data or other position data. The detected touch actions may then be correlated both to user commands and to an element or elements displayed on the display screen or view presented by the display no. In response to the user command, the processor may take actions with respect to the identified element or elements. Touches that are capable of being detected may be made by various contact objects, such as thumbs, fingers, appendages, styli, pens, pointers and the like, although the selection of the appropriate contact object and its construction will depend on the type of touchscreen implemented on the device.

The orientation/INS module 124 can include one or more motion or tilt sensors capable of detecting gravity- or motion-induced forces to determine physical conditions of the device such as acceleration and angular velocity, which in turn can be used to determine the orientation or geometric attitude of the mobile device 100, or changes thereto, in two or three dimensions. Motion sensors can include an accelerometer for detection of linear motion, and a gyroscope for detection of rotational motion. The selection and implementation of suitable motion sensors will be understood by those skilled in the art.

Although not shown in FIG. 1, the electronic device 100 may also include one or more proximity sensors which can be used to determine distance of the device 100 from a surface. An example of a proximity sensor is a radiation sensor for detecting reflected radiation, such as infrared light, from a nearby surface. Such a sensor may typically be used in conjunction with voice or video communication functions on the device 100 to determine when the user is present in front of or in close proximity to the display 110.

Possible network topologies for use with the device 100 will be known to those skilled in the art. As only one example, a host system may be provided, which can be an own-premises local area network (LAN), or wide area network in communication with LANs, with local computing resources such as one or more servers, data repositories and client devices such as terminals. The host system may comprise those components necessary to provide services to users over the LAN and also over a public or private network, such as the Internet, at their respective devices 100. The services can include but are not limited to messaging, directory services, collaborative applications, calendaring applications, search engines and file servers. The device 100 could access the host system using one or more of its communication subsystems 104a to 104n, for example through an access point, via the public or private network, and optionally via a public switched telephone network and a wireless network.

The electronic device 100 can be used to display various types of content, such as documents generated at the electronic device 100 or received over a network by the electronic device 100, in one or more application environments executing on the electronic device 100. The examples and embodiments presented herein are described principally with reference to webpages and similar structured documents (generally referred to herein as "documents") presented in a browser application environment. The general form and construction, and operation of such documents and application environments will be known to those skilled in the art.

Webpages and similar documents often contain one or more interactive elements rendered and displayed by the application environment. An "interactive" element, as used herein, is intended to include those objects, elements or components of a document which are associated with interaction functions responsive to user input. A common type of user input is a "click" (e.g., a pointing device event, such as might be detected from mouse or trackball input) or a "tap" (e.g., a touch event detected from touchscreen input), but other forms of input using diverse user interfaces provided for the electronic device 100 such as pointing devices, touchscreen interfaces, and the aforementioned tracking and perceptual UIs, can be used. Detection of the user input for a selected interactive element results in initiation of an interaction function for that interactive element in response. The interactive element may be any suitable content element comprised in the document for which an interaction function is defined. The interaction function, generally speaking, causes a change in the state of the document or the application environment, based on the particular interactive element selected. A simple example is a text hyperlinked in a webpage to a resource at a network address (e.g., URI, or Uniform Resource Identifier) specified in the hyperlink. When user input is detected for that hyperlinked text, it may invoke a request by the application environment over the network for the resource (e.g., a new webpage) at that address.

Other examples of interactive elements include a control for embedded content (e.g. virtual buttons, images or other elements that can be used to invoke play or pause commands for a video file embedded in the document) and a form control. Any specific instance or class of element within the document, such as an image, span of text, and so forth, can be defined as an interactive element either explicitly by a script or other mechanism defined specifically for the document, element or class; or implicitly (i.e., by default) though an associated function defined in the application environment.

An interaction function may be defined specifically in or for a document, as in the case of a script or definition included within the document itself (e.g., script included in the <head> section of a webpage that is executed by the browser 164 in response to the input). The script or definition may apply only to that particular interactive element, to a particular class or classes of interactive elements in the document, or to all interactive elements in the document. The function may also be defined for the document as a script or instructions provided to the electronic device 100 for use with the document (e.g., a separate script file, Cascading Style Sheet file, or other data delivered to the electronic device 100 along with a webpage). The function may alternatively be a native function defined in the application environment. This native function may be a default function executed in response unless a specific function is explicitly defined for the document.

The content of a given document can contain zero, one, or a plurality of such interactive elements, either explicitly or implicitly associated with interaction functions, as noted above. Their physical location within the document as rendered and displayed onscreen by the electronic device 100 will depend on the area of the display 110 allocated to the display of the document. Depending on the available viewing region, some or all of the document is presented onscreen. The available viewing region may be the entirety of the display area of the display 110, or some portion thereof—for instance, if the document is presented in a windowed application environment where the view of a given application shares screen space with other application views. The scale at which the document is presented may depend on native application environment or operating system parameters, or on user choice; for instance, a browser application may default to rendering and displaying a webpage at a nominal "100%" scale, but the user may choose to specify an enlarged viewing scale to make the content more legible. In fact, the same document, rendered on different devices 100, may actually be displayed at different actual physical scales depending on the display platform. The display screen size may range from a large desktop monitor to a small cellphone screen, and the resolution of an electronic device display can also vary between devices, even if the absolute dimensions of the device screens are similar. The effect is that a document designed or formatted for presentation on one kind of platform (such as a desktop computer) may be legible by the user on that platform—text displayed large enough to be read at normal viewing distances, for example—but not so when displayed on a another platform, such as a smartphone or tablet computer with a smaller display no.

The effect on a smaller display screen is that various elements of the document—non-interactive and interactive elements alike—may be positioned relatively close together, since the overall size of the document as rendered and displayed is reduced. The general problem of legibility may therefore be exacerbated by the problem that can be difficult for the user to distinguish between adjacent interactive elements onscreen when he or she attempts to interact with them using an input mechanism (such as the pointing, touchscreen, tracker and perceptual UIs mentioned above) since fine changes in input (the distance by which a mouse is moved, or a finger on a touchscreen is moved for example) can result in an abrupt change in the selection of an interactive element. In the case of touchscreen interaction, in particular, where the display 110 displaying the document is a touchscreen for receiving the user's input, the user may have difficulty aligning his or her digit, stylus, or other touchscreen input apparatus with the desired interactive element. In particular, when the user is expected to use a finger to touch the screen at a location corresponding to the desired element, the user's own finger might obscure so much of the displayed content that the user cannot visually ascertain that the correct element is being selected. The same can be true when the user input is effected by a pointing device, since the pointing device is often used to direct the position of a cursor, pointer or other graphical feature on the screen, and the position of that graphical feature is used to identify the element of interest; that graphical feature may also obscure the content of the document.

This is illustrated in the context of a webpage displayed on an electronic device 100 with an integrated touchscreen in FIG. 2. The a rendering of a webpage 200, here rendered and displayed at an initial scale (which may be the nominal 100% scale, or another scale specified by the user or the application rendering the webpage for display), includes a number of elements, some of which can be interactive. Container element 210 comprises a text block that itself includes a number of hyperlinked text strings, such as 214, 216 and 218 indicated in FIG. 2; thus each of these text strings 214, 216, 218 is a distinct interactive link element. Contained within the element 210 is a further interactive element, which may be another text block or a graphic element 212; this further element 212 is immediately adjacent the text block 210 and in this case constitutes an advertising banner, while the text block 210 contains substantive content (i.e., not advertising or incidental content). This element 212 may be hyperlinked to an advertiser's website or to an advertising platform resource, which operates to redirect the browser application executing on the electronic device 100 to an advertiser's site. Container element 220, below the first container element 210, also contains substantive text content but no interactive elements. Container element 230 contains a series of interactive text elements, including hyperlinked elements 232, 234, and 236. Container element 240 contains graphics and text; as part of this content, interactive graphic elements 242, 244 are associated with scripts or other functions so that when they are activated, a corresponding function (for example, providing a user interface for the user to create a reply message, or to send a private message to another user) is invoked. Those corresponding functions may simply involve invoking a hyperlink to another webpage that contains form fields for inputting message content.

The potential difficulty for the user is that the user's fingertip (used to implement touches on the touchscreen) in fact obscures some content when the user touches the screen, with the effect that the user cannot easily tell whether his or her finger is touching the correct area of the screen. As is understood by those skilled in the art, when the user's fingertip touches a touchscreen, the actual area of contact is not a single point, but rather a two-dimensional area. Sensors in the touchscreen and/or a controller or application processing the detected touch signal may resolve that area to a single touch point (e.g., the centroid of the area). That touch point can be defined as coordinates on the touchscreen, which can then be correlated to a point on the document, which may coincide with an interactive element. The touch point thus identifies an element in the displayed document.

However, the user's fingertip in contact with the touchscreen covers a relatively large area compared to the actual touch point, and perhaps the displayed content. Thus, the user's fingertip or actual contact area might cover more than one interactive element: see the phantom regions indicated at 250*a*, 250*b* and 250*c* of FIG. 2, which illustrate possible positions of the user's fingertip in contact with the touchscreen. Region 250*a* covers parts of two interactive elements 212, 214; region 250*b* covers parts of three interactive elements 232, 234, 236; and region 250*c* covers parts of two interactive elements 242, 244. The actual touch point computed from the detected touch may coincide with one of these interactive elements, or it may coincide with a point between two or more elements. The user may have intended to select one of these interactive elements, but at the scale at which the webpage 200 is currently presented, the relative size of his or her fingertip compared to the size of the interactive elements displayed on touchscreen may prevent the user from gauging visually whether the correct element will be selected by the touch. Thus, the user may inadvertently select the wrong element, resulting in resources being consumed in processing a request for a new webpage, transmitting the request, and receiving, rendering and displaying the new webpage, because the original input was not accurate. A touch by a fingertip in region 250*d*, on the other hand, is unlikely to result in incorrect selection of a different interactive element since there is only one, 218, in the region; however, if the touch point resolves to coordinates outside the bounds of the interactive element 218, then the interactive element 218 will not be selected at all, resulting in a need for a repeat of the user input and processing of that repeated input. As noted above, this difficulty can present itself in other contexts with other types of input devices. For instance, a graphic pointer icon displayed onscreen and controlled using an input device may obscure the displayed content, or the shape of the pointer icon may be ambiguous as to what element will be selected (e.g., it may not be clear whether the center or the end of the pointer icon is used to select an element).

A solution to this problem of too-small elements displayed on screen is for the application environment to automatically render and display the document at a larger scale, for instance so that the smallest text or interactive element in the document is displayed at a predetermined size; however, this of course will reduce the actual area of the document that is displayed at a given time, perhaps depriving the user of needed context in order to determine which interactive element to select, and/or requiring the user to engage in an excessive amount of scrolling or panning in order to view the document. Another solution is for the user to manually instruct the application to enlarge (or "zoom in" on) an area of the document containing the interactive element of interest on the screen before selecting the element and thus invoking the interaction function. However, this results in additional processing time and resources being dedicated to processing the zoom instruction, and if the result of the interactive function is to change the appearance or content elsewhere in the displayed document outside the zoomed area, then the effect of the interaction may not even be visible onscreen; the document would have to be re-rendered and re-displayed at its previous scale first. An example of this is a webpage containing comments that are normally moderated or hidden, that are revealed when a "show comments" interactive element is activated.

A modification of the latter solution is for the application to automatically enlarge the document in the display upon detection of an attempt by the user to activate an interactive element. For example, if a tap on a touchscreen (as the user input intended to invoke the interaction function) is detected in a region proximate to hyperlinked content in a webpage, the browser might automatically replace the displayed webpage with an enlarged view of the same webpage, so that the user has a further opportunity to accurately select the desired hyperlink. However, given that the user had already attempted to select a hyperlink with his or her original input, zooming into the document instead of initiating a request based on the hyperlinked address might be interpreted by the user as an unexpected result or fault of the application since the user was expecting a new webpage to be retrieved. This also requires further consumption of resources, as the entire display area containing the webpage must be redrawn; it also requires a further step on the part of the user, who must reorient him or herself when the enlarged document is displayed, again identify the hyperlink of interest, and select it once again by repeating the original input.

Accordingly, a system and method, implemented on a device such as the electronic device 100, and in the examples described herein, using a touchscreen, is provided that allows the user to more easily navigate the displayed document at its original size in order to accurately select a single interactive element without requiring substantial interruption or modification of the user's original input that was intended to be used to select the interactive element and invoke the corresponding interaction function in response.

FIG. 3A depicts the electronic device 100 displaying a first view 300 of a webpage, which in this case is a rendering of the webpage at an initial scale such as a default scale (this may be the nominal "100%" mentioned above; a scale that allows the full width of the document to be displayed within the width of the available display area, etc.). The webpage shown here is the same as the example of FIG. 2; thus, again, this webpage includes regions 210, 220, 230 and 240, each of 210, 230 and 240 containing one or more interactive elements as before. Region 310a illustrates a possible contact area resulting from a touch on the screen. As in the case of the region 250a of FIG. 2, this contact region 310a intersects both interactive elements 212 and 214. Depending on how the touch point is computed from the detected touch, the actual touch point position may coincide with element 212, element 214, or neither.

Figure 3B:
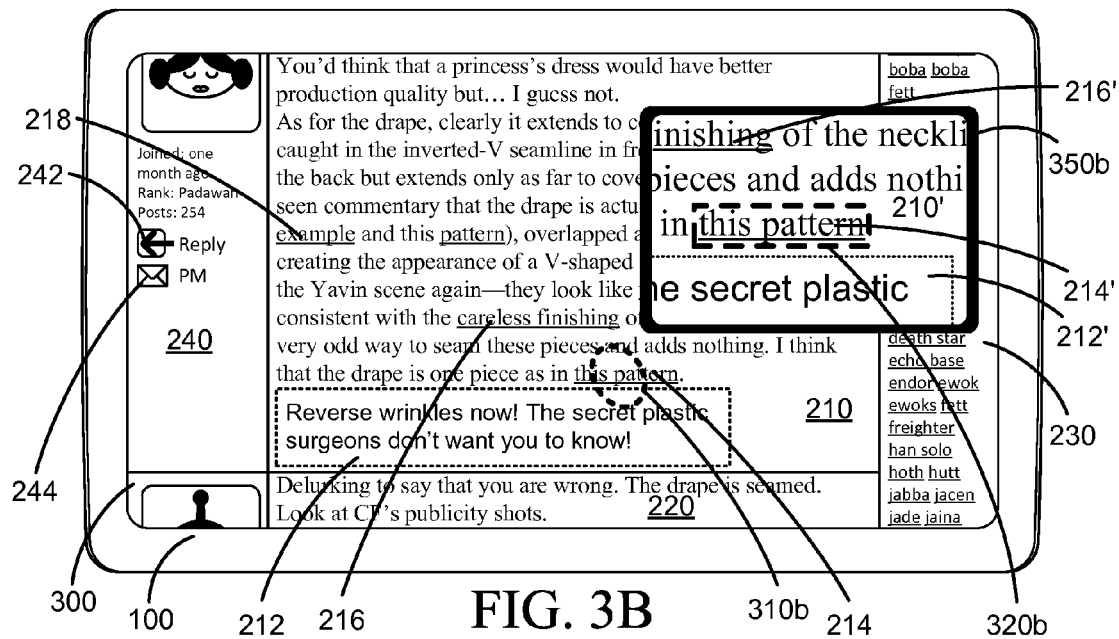

Thus, when a touch is detected in on the touchscreen of the electronic device 100 in a position, it is determined whether the touch point is determined to be in a region of the document where there is at least a certain density of interactive elements. If so, a second, "pop-up", or overlay view 350a is displayed, providing a second view of the same document shown in the first view 300. This second view 350a displays a portion of the originally displayed document at an enlarged scale; thus, it can be seen that second view 350a in this example includes an enlarged view 210' of the container element 210. This particular region includes at least a portion of the interactive elements 212, 214 in the immediate vicinity of the detected touch point, also displayed at an enlarged scale 212', 214'. The detected region of interest (i.e., the region of the displayed webpage in the first view 300 that is of apparent interest to the user, as determined by the detected touch point from contact region 310a) is thus enlarged to assist in accurate identification of the particular interactive element 212, 214 of interest. This second view 350a can be displayed in response to the detected touch, but also while contact continues to be detected by the touchscreen; in other words, the user still has their finger, stylus, pointer icon, etc. in position when the second view 350a is displayed. The immediate or near-immediate display of the second view 350a thus conveys to the user that some disambiguation of the input may be needed; in other words, the display of the second view 350a can constitute an automated request for confirmation or refinement of the detected touch input (or other input). The second view 350a can include additional content, such as a message, to indicate to the user that some refinement of the input may be required. In the example of FIG. 3A, the second view 350a also includes optional highlighting or another indicator 320a, here shown in FIG. 3A as a highlight box, which indicates the interactive element that currently coincides with the currently detected touch point from contact region 310a. The second view can be displayed so that it is adjacent or visually near the first view 300; or, as in the examples herein, the second view can be displayed so that it at least partially overlays the first view. The position of the overlaying second view can be selected so that it does not unnecessarily obscure the region of interest around the touch point in the first view 300, and the position of second view can move as the touch point in the first view 300 moves, as can be seen in FIGS. 3B and 3C.

When the second view 350a is displayed, the user has the option of moving the touch point while maintaining contact with the touchscreen, and ending the contact, which would have the effect of cancelling the display of the second view 350a and/or initiating an interaction with a selected interactive element. The former option, moving the touch point, is illustrated in FIGS. 3B and 3C. FIG. 3B illustrates the first view 300 again, this time with the contact region 310a of FIG. 3A moved to the position as shown by region 310b. Upon detection of this movement of the touch point, the second view can now be updated as shown in 350b; in response to the detected move, the document region that is enlarged in the second view 350b can be updated to reflect the movement of the touch point (for example, the bounds of the enlarged region shown in the second view can be a rectangular area having the computed touch point at its center). The updated enlarged region may include one or more of the interactive elements 212', 214' originally shown in the second view 350a when it was initially displayed, but if the movement of the touch point in the first view 300 is greater, the updated second view 350*a* may no longer contain any of those initially displayed elements. In this case, second view 350*b* still does include those elements 212', 214'. In addition, any highlighting or other indication of the interactive element currently coinciding with the position of the touch point can be updated. In this example, it has been determined that the touch point has moved to within the bounds of the interactive element 214; thus, enlarged element 214' in the second view 350*b* is shown as highlighted with highlighted box 320*b*. Movement of the touch point in the first view 300 therefore changes the highlighted selection shown in the second view 350*b*. If the touch point is moved to a position where it does not coincide with any interactive element—for instance, between elements 212 and 214—then the second view 350*b* may be updated to remove any highlighting of any of the interactive elements included in the enlarged region.

Figure 3C:
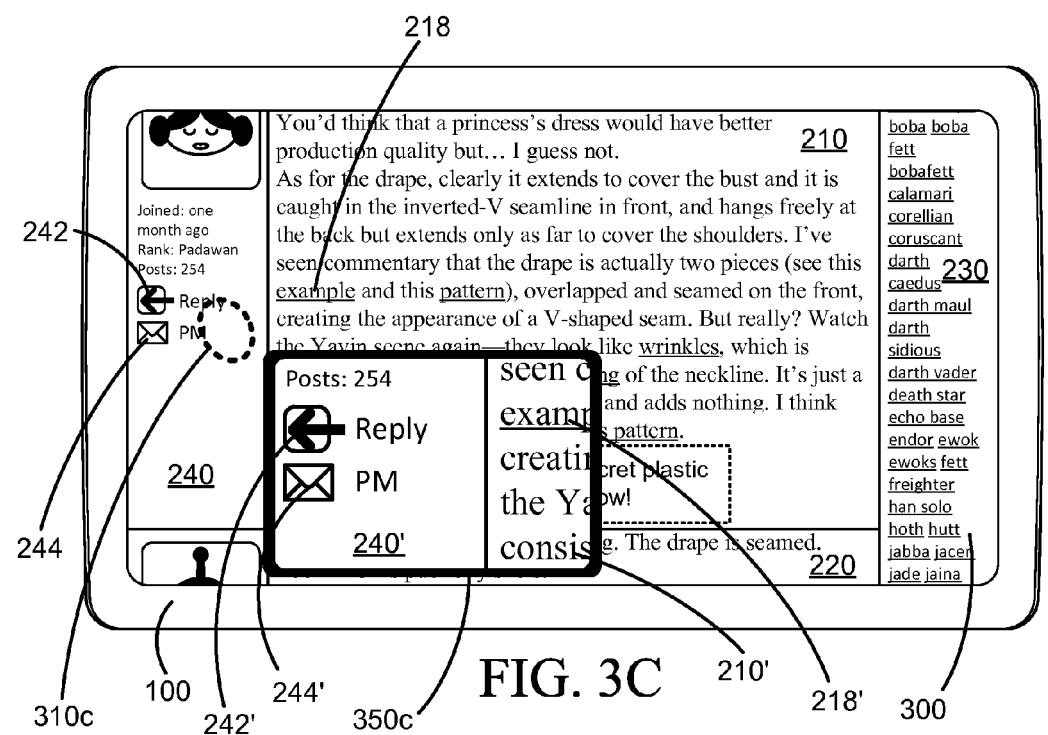

The touch point may be moved to a completely different area of the touchscreen, as shown in FIG. 3C. In this example, as can be seen by the new position of the contact region 310*c*, the touch point will now be somewhere in the container element 240; however, as can been in FIG. 3C, this area of the first view 300 is largely devoid of any interactive elements. The touch point will therefore not coincide with any interactive elements. The updated second view 350*c* now reflects the current position of the touch point by displaying an enlarged region of the document shown in the first view 300; this enlarged region includes an enlarged portion of container element 240, shown as 240', as well as enlarged container region 210'. The bounds of this enlarged region shown in the second view 350*c* do include a couple of interactive elements, shown enlarged at 242', 244'. However, since the touch point does not correspond to any interactive element, there is no highlighting shown in the second view 350*c*.

It can be seen from the examples of FIGS. 3A, 3B and 3C that the second view 350*a*, 350*b*, 350*c* is displayed while contact defining a touch point is maintained on the touchscreen, and specifically, while that contact defining the touch point is within the document displayed in the first view 300, and also that the second view is updated to reflect which interactive element, if any, corresponds to the current touch point within the first view 300. Thus, the user is able to use the second view as guidance to refine the selection of a particular interactive element within the first view 300, without having to cancel the touch that he or she had originally initiated in order to select the interactive element in the first place. In addition, when the second view overlays the first view, it can be configured to "follow" the path of the touch point as the user moves the touch point (while maintaining contact) within the first view 300, as can be seen from the position of the second view 350*a*, 350*b*, 350*c* in FIGS. 3A to 3C.

Ending the touch, by lifting the finger from the touchscreen or otherwise breaking contact with the touchscreen, can trigger dismissal of the second view 350*a*, 350*b*, 350*c*. At the same time, if one particular interactive element corresponds with the last detected touch point location (i.e., the touch point position at the time contact ends), then the electronic device 100 can automatically initiate the appropriate interaction activity for that interactive element. Turning back to FIGS. 3A and 3B, for example, the user may have placed his or her finger on the first contact region 310*a*, with the intention of selecting hyperlink 214. However, as can be seen in FIG. 3A, in response to detecting the touch at 310*a*, the electronic device 100 responds by resolving the detected touch to a touch point coinciding with the interactive element 212, and because disambiguation is needed, by also displaying the second view 350*a* showing the enlarged region of the webpage and indicating that the interactive element 212 is the one that will be selected by the user's current touch point.

In view of this, the user can then move the contact region to 310*b*, with the resultant update to the second view 350*b*. The second view 350*b* now shows that the currently detected touch point corresponds to the interactive element 214. The user then breaks contact, ending the touch, and in response to the detected end of the touch, the electronic device 100 automatically initiates an action for the interactive element 214, which in this case is requesting a further webpage as indicated by the hyperlink of interactive element 214. If, on the other hand, the touch had been ended at a touch point that did not coincide with any interactive element, then the second view 350*a* may simply be dismissed with no interaction function undertaken in response.

While the second view 350*a* could be displayed in response to any detected touch on the touchscreen, in many cases it may not be needed by the user. Accordingly, the second view 350*a* can be triggered by the determination that the touch point is in fact located in a region of the document where there is at least a specific "density" of interactive elements (e.g., a certain number of interactive elements within the contact region 350*a* or within a unit area surrounding the touch point), or when the touch point is determined to be within a specified distance of the bounds of more than one interactive element (which can also include the case where the touch point is within the bounds of one element, but is also close to the bounds of another interactive element). The bounds of a given interactive element may be defined as coordinates within the document as might be determined when the document is rendered for display. When the location of the touch point is determined to meet a condition such as one of the above (within a region having a certain density of interactive elements, or within a set distance of more than one interactive element, etc.) then the touch point may be considered to be within a disambiguation region for those interactive elements.

FIGS. 4A and 4B illustrate one method of determining whether the touch point is in a disambiguation region. FIG. 4A illustrates an excerpt 400 of the webpage shown the first view 300. This excerpt includes a number of interactive elements 212, 214, 216 and 217. Schematically, they are represented as regions 212, 214, 216 and 217 in FIG. 4B. The bounds of these regions may be determined by a rendering process (e.g., by a browser application rendering the webpage and the elements contained therein). In addition to these bounds, an additional disambiguation boundary is defined for each interactive element as shown by regions 412, 414, 416 and 417. These regions represent a defined distance beyond the bounds of interactive elements 212, 214, 216 and 217, respectively. When a touch point is determined to reside entirely within a single interactive element and not within the disambiguation boundary of any other interactive element, then the touch point may be determined to be unequivocally associated with that one interactive element. For example, touch point 450*a* is within the bounds of element 212, and is only contained within the disambiguation boundary 412 of the same element. Therefore, a touch point detected at this position would not trigger the second view 350*a*.

On the other hand, touch point 450*b* is also located within the bounds of the same interactive element 212, but it is also within the disambiguation boundary 414 of element 214. In that case, the electronic device 100 may be configured to display the second view 350*a* to invite the user to confirm or alter the position of the touch point before an interaction function is initiated for the element 212. If the second view 350*a* were displayed in response to detection of this touch point 450*b*, then the element 212 may be indicated as the one that would be selected if the touch were completed (e.g. ended) in that position. In some implementations, however, because the touch point 450*b* is contained within the actual bounds of one element 212, the second view is not triggered at all, so when the touch is completed, the electronic device 100 responds by initiating an interaction function for that element 212. Thus, depending on the implementation, the touch point 450*b* may or may not be within a disambiguation region.

The third touch point 450*c* shown in FIG. 4B is positioned within the disambiguation boundary 412 of element 212, as well as the disambiguation boundary 414 of element 214. This touch point 450*c* can be considered to be within a disambiguation region for both elements 212 and 214 and thus may trigger display of the second view.

The fourth touch point 450*d*, however, is only within the disambiguation boundary 417 of one element 217. Accordingly this touch point does not trigger the display of the second view, and since it is not within the bounds of the interactive element 217, this touch point may not trigger any interaction function unless the electronic device 100 is configured to still respond with the interaction function in this case. These examples in FIG. 4B illustrate the case where only two disambiguation boundaries might intersect, but it will be understood by those skilled in the art that more than two disambiguation boundaries may intersect when three interactive elements are proximate to the touch point.

Figure 5:
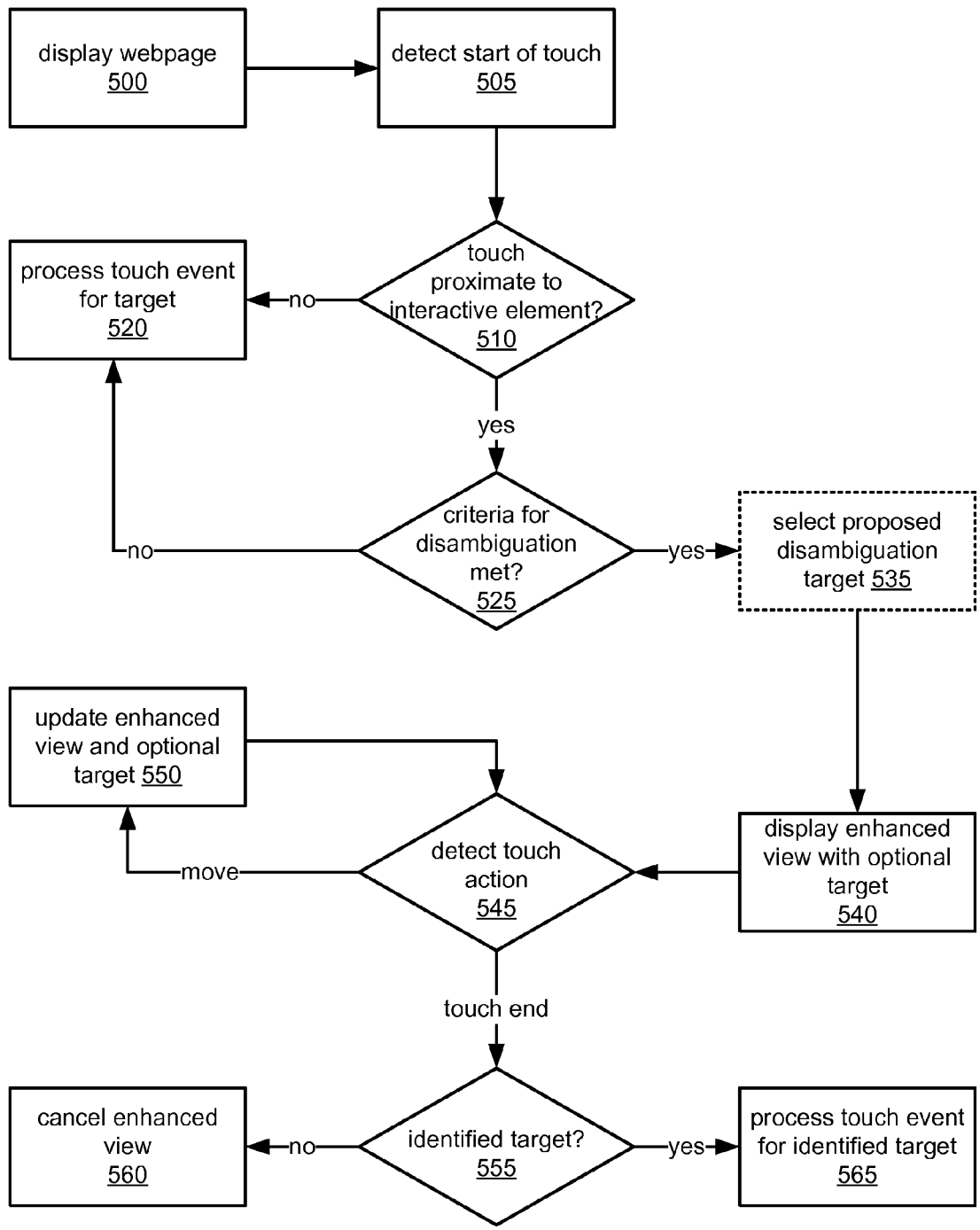
FIG. 5 is flowchart for an example method implementing the enhanced view examples shown in FIGS. 3A to 3C.

FIG. 5 illustrates a possible method that can be used to implement the examples illustrated in FIGS. 3A to 3C. At 500, a webpage (or other document) is displayed on a touchscreen device. At 505, a start of the touch defining the initial position of the touch point is detected. This can be a starting touch input, such as a touch down onto the surface of the touchscreen display 110; this starting touch input is detected by the touch user interface and used to determine the location of the touch point. At 510, it is determined whether the touch point is proximate to an interactive element. This can include being within the actual bounds of an interactive element (such as the case with the touch point 450*a* in FIG. 4B) or within the disambiguation region of at least one interactive element (such as the case with the touch points 450*b*, 450*c*, 450*d*). If the touch point is not proximate to an interactive element, the detected touch and associate event (e.g. touch start, move, touch end, etc.) is processed for whatever element is the target indicated by the touch point at 520. This may result in no action by the electronic device 100, for example if no element is selected by the position of the touch point.

If the touch point is proximate to an interactive element, then it is determined at 525 whether the criteria for disambiguation is met. This can be according to the examples described above with reference to FIG. 4B, where the second view is invoked when the touch point is located at least within the disambiguation boundary of at least two interactive elements (which can optionally include the case where the touch point falls within the disambiguation boundary of one interactive element and the disambiguation boundary of at least one other interactive element). If the criteria are not met, then the touch continues to be processed at 520 as described above. If, on the other hand, the criteria are met, then the second view is displayed at 540. This second view as described above is shown at a magnified scale, and can optionally be enhanced further by identifying one potential target element from the interactive elements contained in the second view. This potential target element can be an interactive element that does actually coincide with the current position of the touch point, as described with reference to FIGS. 3A, 3B above. In another implementation, this can include a predicted target that the electronic device 100 determines was the intended target of the touch point. This could be the interactive element of the plurality of interactive elements proximate to the touch point that is the closest to the touch point, for example.

At 545, a further touch action is detected. This may be a movement of the touch point in the first view, or it may be an end of the touch. If the touch point is moved, then at 550 the second view and optionally the target (or proposed target) interactive element is updated on the display. If the action is an end to the touch, then at 555 it is determined whether a target interactive element is identified by the touch point. In the case where a predicted interactive element is determined as mentioned above, this determination can also include whether such a predicted target has been identified. If there is an identified target interactive element, then at 565 the touch is processed for that identified element; this would be the invocation of an interaction function associated with that element. Otherwise, the second view is cancelled ad no interaction function is undertaken at 560.

In the above examples, the user maintains a single contact on the touchscreen in the first view 300 of the document, thus avoiding the need for the user to reorient him- or herself and commence a new touch action, as might be necessary in the case where the entire document is enlarged in the first view. The user thus only engages the touchscreen with only a single touch action—touching down on the touchscreen surface, optionally moving touch point while keeping contact, then lifting contact from the surface—rather than multiple actions, as is the case where the user is required to remove his or her finger or stylus, etc. from the touchscreen surface and then touch down on another location. The response of the electronic device 100 is therefore more predicable to the user. This solution, also involving a single touch point within the originally displayed document of the first view 300, can be implemented with a touchscreen capable of only detecting one touch point at a time (i.e., not a multitouch-enabled touchscreen).

Figure 6A:
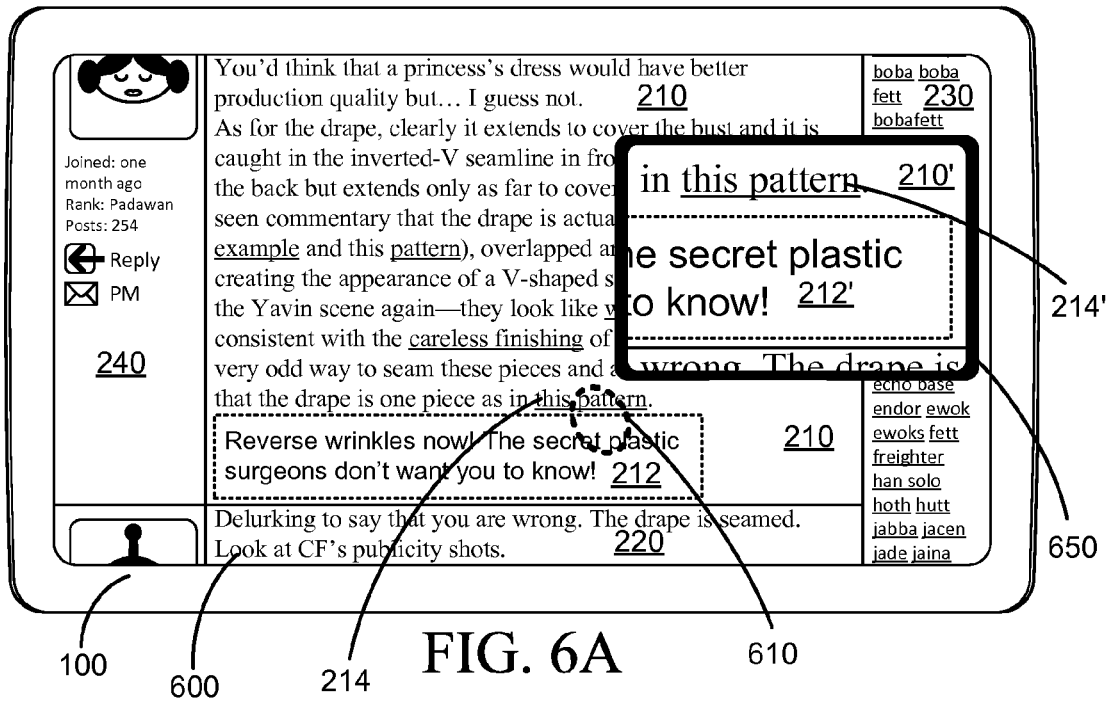
FIGS. 6A and 6B are illustrations of further examples of enhanced views of the webpage of FIG. 2 in a further implementation.

In another example, though, multitouch can be used in a similar manner. Turning to FIG. 6A, again the webpage is rendered in a first view 600 at an initial scale. And, again, contact is made on the touchscreen at region 610, which as can be seen in FIG. 6A intersects portions of at least two interactive elements, 212 and 214, thus resulting in invocation of the second view 650, again similar to the second view 350*a* of FIG. 3A. Triggering of the second view can occur in response to the same criteria discussed above for the example of FIG. 3A. Once again the enlarged region shown in the second view 650 is determined by the initial position of the touch point discerned from the contact 610, for example, a rectangular region centered on the calculated touch point location.

Figure 6B:
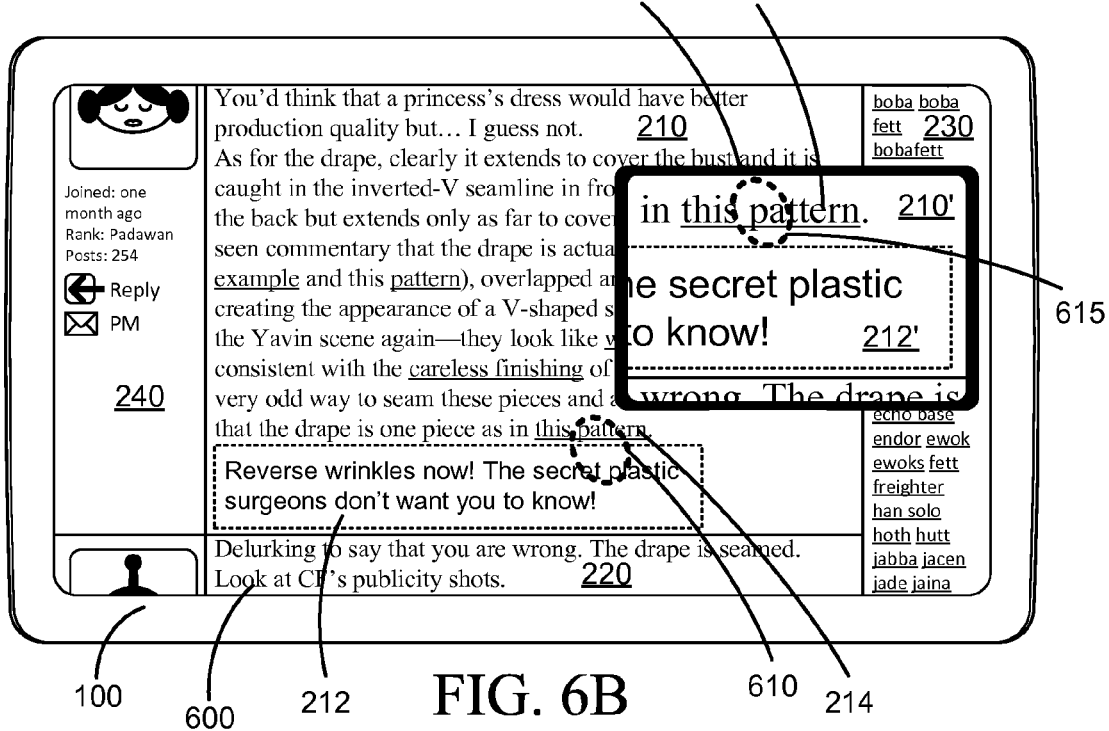

While the position of the original contact region 610, and thus the touch point, can be refined by the user moving the contact region while maintaining contact on the first view 600, the user can also use another finger or touch means to select one of the interactive elements that is displayed in the second view 650 while the contact is maintained on the first view. This is shown in FIG. 6B, where a second contact region 615 is illustrated in phantom. This contact region intersects one interactive element 214' as it is displayed in the enlarged view. Thus, even though the initial touch point (as defined by the contact region 610) was not located on the desired interactive element and was not moved to be located on the desired interactive element, the user can still quickly select that element in the second view 650. In response to the selection of the enlarged interactive element 214', the interaction function can be initiated for the interactive element 214 as it was originally rendered in the first view. If, on the other hand, the user released contact at the first contact region 610 without initiating a second touch in the second view 650, the second view 650 may be dismissed without invoking any interaction function. This multitouch example can be implemented in combination with the single touch implementation of FIGS. 3A to 5, in which case the user may have the option of refining the selection of an interactive element either by moving the original contact region 610 within the first view, or by initiating a further touch at a further touch point within the second region.

Figure 7:
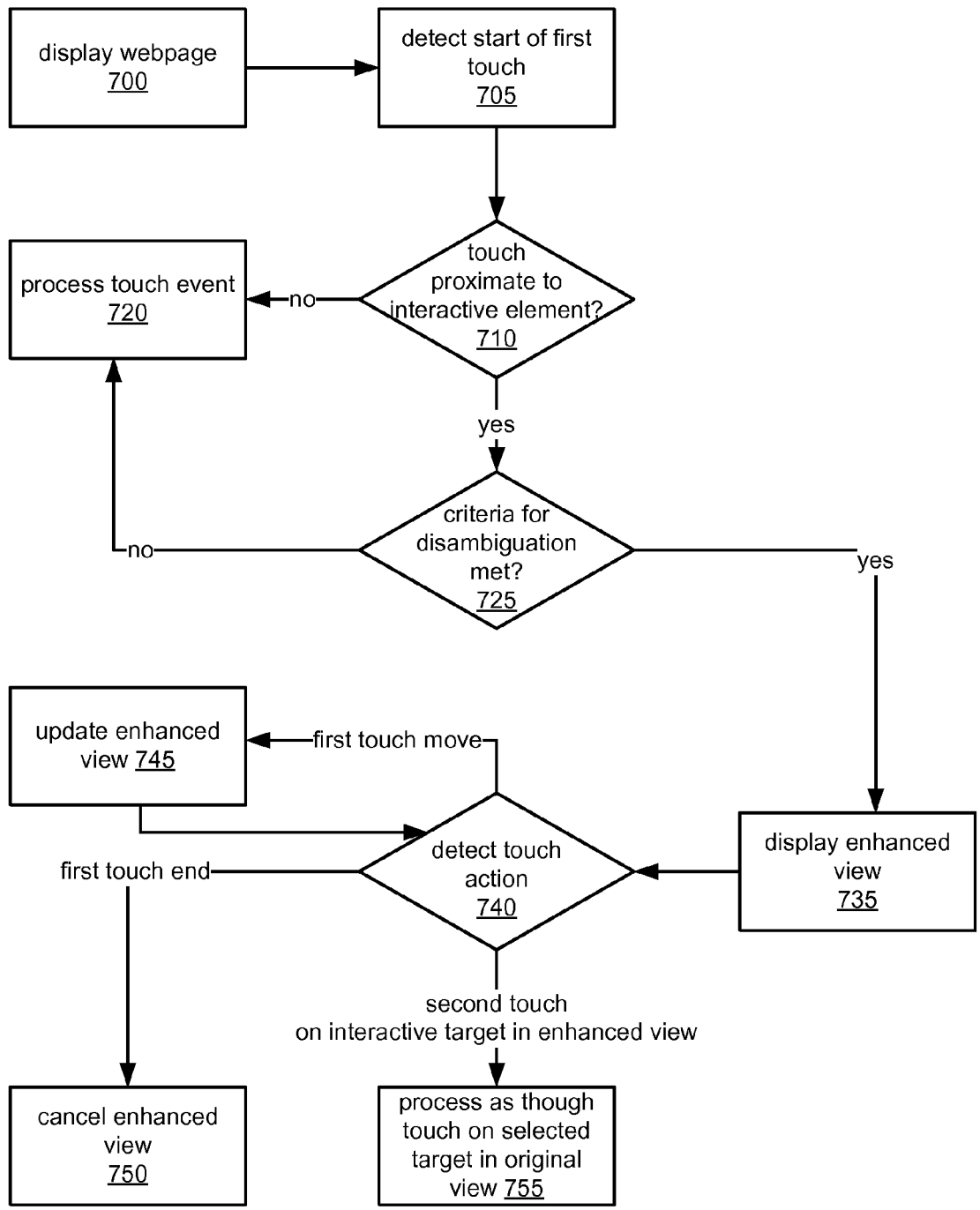
FIG. 7 is a flowchart for an example method implementing the enhanced view examples shown in FIGS. 6A and 6B.

FIG. 7 illustrates an example method for use in this implementation. At 700, the document, again in this case a webpage, is displayed in a first view. At 705 the start of the first touch is detected, defining the initial position of the first touch point in the first view. At 710 it is determined whether the touch is proximate to an interactive element. This determination can be made in a similar manner to that discussed above. If the touch is not proximate to an interactive element then the touch continues to be processed for the target that is indicated by the touch at 720, similar to the processing at block 520 in FIG. 5. If the touch is proximate to an interactive element, then it is next determined at 725 whether the criteria for disambiguation have been met, that is to say, whether the enhanced second view is to be displayed. This determination can be carried out in a similar manner to that described above as well. If the criteria have not been met then the process continues to 720. If the criteria have been met, then this second view is displayed at 735, as described above.

A touch action is detected at 740. If the touch action is determined to be a movement of the first touch point (i.e., contact is maintained at the touchscreen at the first touch point in the first view, but a touch move is detected, resulting in movement of the first touch point within the first view) then the second view is updated at 745 as described generally above with respect to the first example of FIG. 3A to 3C. If the touch action is determined to be an end to the first touch, then the second view is cancelled at 750, and no interaction function is invoked. If, on the other hand, a second touch is detected in the second view, with a touch point located on an interactive element in the second view, it is determined that this interactive element has been selected, and the touch is then processed 755 as though the corresponding interactive element had been selected in the original, first view. An interaction function can then be automatically invoked for that element. The second view can then be dismissed. In this example, then, the first touch in a disambiguation region of the first view invokes the enhanced representation of the document shown in the second view, at which point the interactive element of interest can be selected in the second view.

Again, as noted above, this example multitouch process of FIG. 7 can be combined with the single touch process of FIG. 5.

Figure 8A:
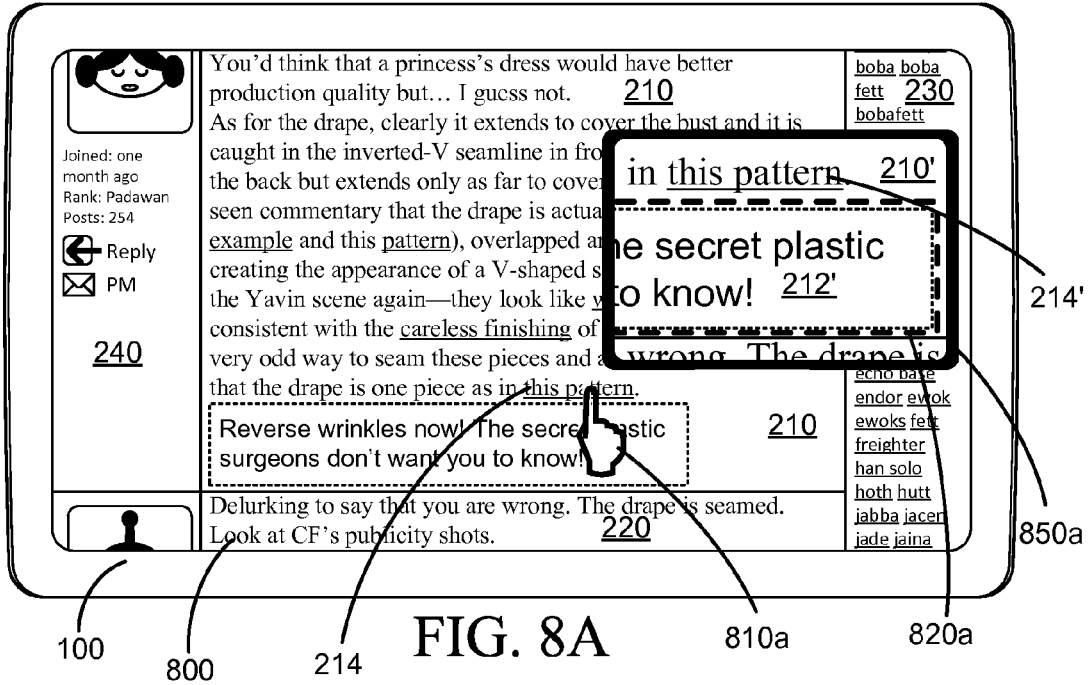
FIGS. 8A and 8B are illustrations of examples of enhanced views of the webpage of FIG. 2 in an implementation using a pointing input device.
Figure 8B:
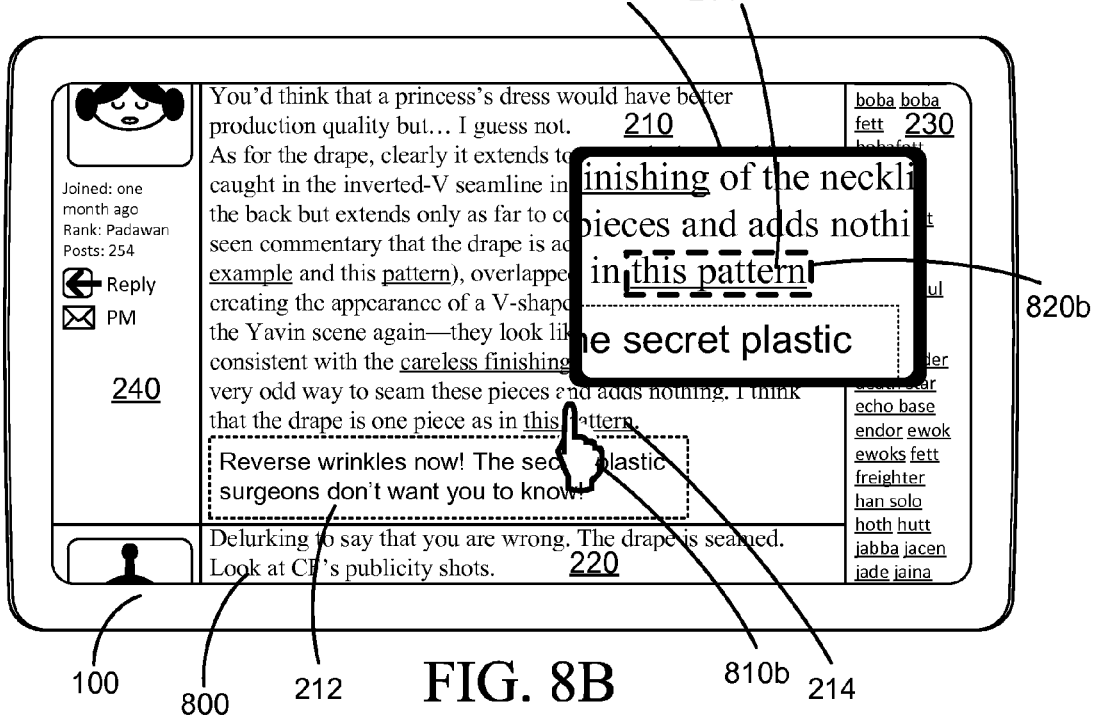

FIGS. 8A and 8B illustrate a process for disambiguating an input click event (i.e., one received from a pointing input device) that is similar to the single touch process described with reference to FIGS. 3A to 3C; however, in this case, the enhanced second view is invoked not by a touch, but by a click or mouse down event, or some other pointing event. As can be seen in FIG. 8A, a first view 800 similar to that of FIGS. 3A to 3C and 6A and 6B is shown. In this case, a pointing icon 810*a* is moved on the display of the electronic device 100 by a pointing input device, such as a trackball or mouse. However, depending on the configuration of the pointing icon 810*a*, it may not be clear which interactive element will be selected, or in any event, the specific coordinates indicated by the pointing icon 810*a* may be within a disambiguation region as discussed above. Thus, in response to a pointing event (e.g., mouse down, click, hover) at coordinates corresponding to a disambiguation region, the second view 850*a* is displayed, much like the second view 350*a*. Like the second view 350*a*, in this example the initial element 212' that is determined to be selected is visually indicated by highlighting 820*a* or by some other indication. In response to movement of the pointer icon to position 810*b* in FIG. 8B, the second view can be updated to 850*b*, and optionally a new interactive element in this enhanced view, 214', shown as selected by highlighting 820*b*. In one implementation, the event triggering the display of the second view 850*a* is a mouse down event, i.e., a click and hold of a mouse button; the pointer icon 810*a* can then be moved while the mouse button is depressed to the new position 810*b*, and release of the mouse button can then trigger the interaction function for the interactive element that coincides with the last position of the pointer icon 810*b* upon release.

Figure 9:
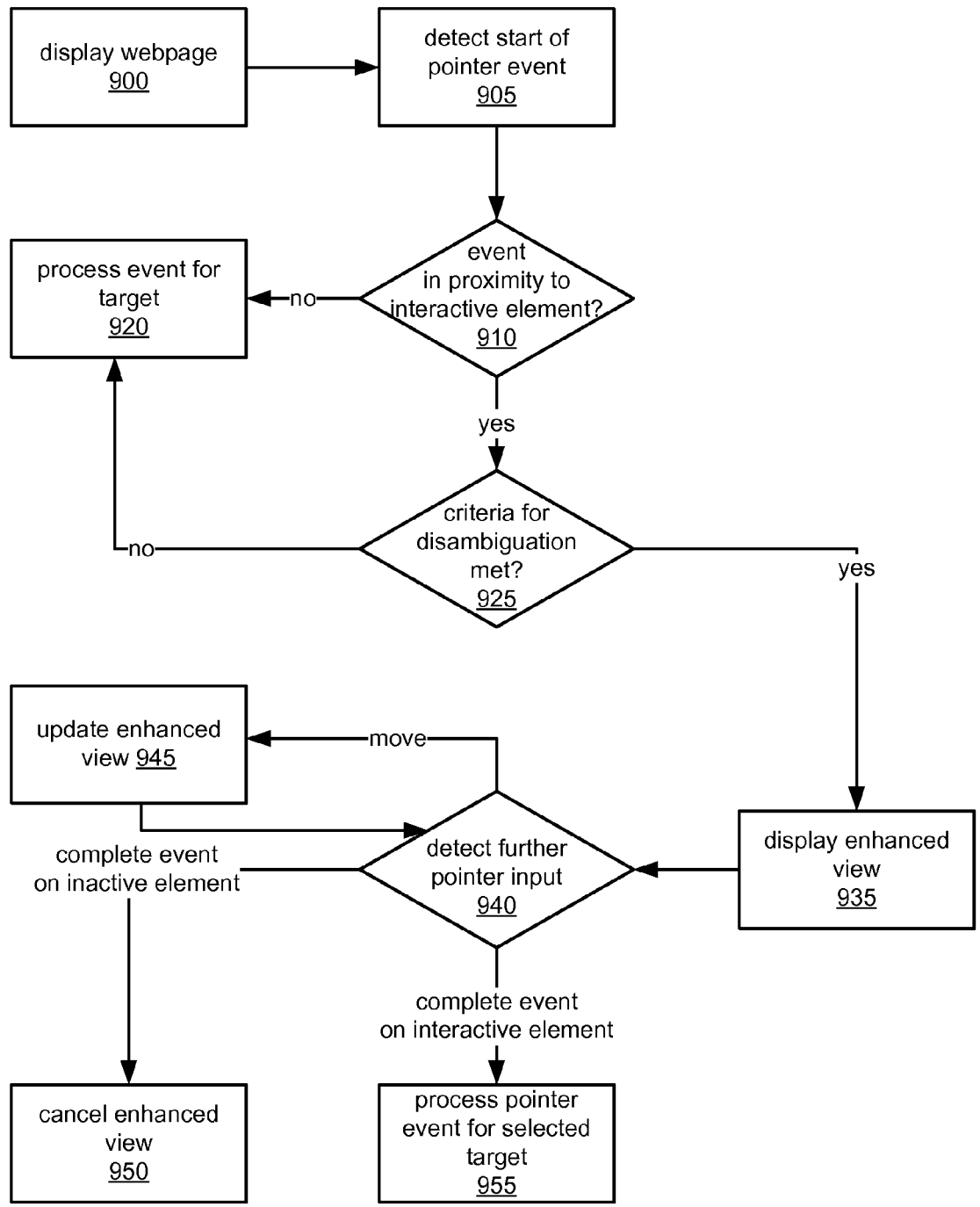
FIG. 9 is flowchart for an example method implementing the enhanced view examples of FIGS. 8A and 8B.

FIG. 9 illustrates an example method for use in this pointer input implementation. At 900, the document, such as a webpage, is displayed in a first view. At 905 the start of a pointer event is detected, defining the initial position of the pointer event in the first view. At 910 it is determined whether the position is proximate to an interactive element, in a manner similar to that described above. If the position is not proximate to an interactive element then the pointer event continues to be processed for the target that is indicated by the current position at 920, similar to the processing at block 520 in FIG. 5. If the position is proximate to an interactive element, then it is next determined at 925 whether the criteria for disambiguation have been met—again, in a similar manner to that described above as well. If the criteria have not been met then the process continues to 920 again. If the criteria have been met, then the second view is displayed at 935. At 940, further pointer input is detected, such as a movement of the pointer icon to a new position. If this is the case, then the second view is updated at 945 in a manner similar to that discussed above. If on the other hand the pointer event is completed (e.g., a release of the mouse button) but the latest position of the pointer icon is not over an interactive element, then the second view is cancelled at 950. If the pointer icon is indeed over an interactive element, then the completed pointer event is processed for that interactive element at 955, thus invoking an interaction function for that element, and the second view can be dismissed.

Figure 10A:
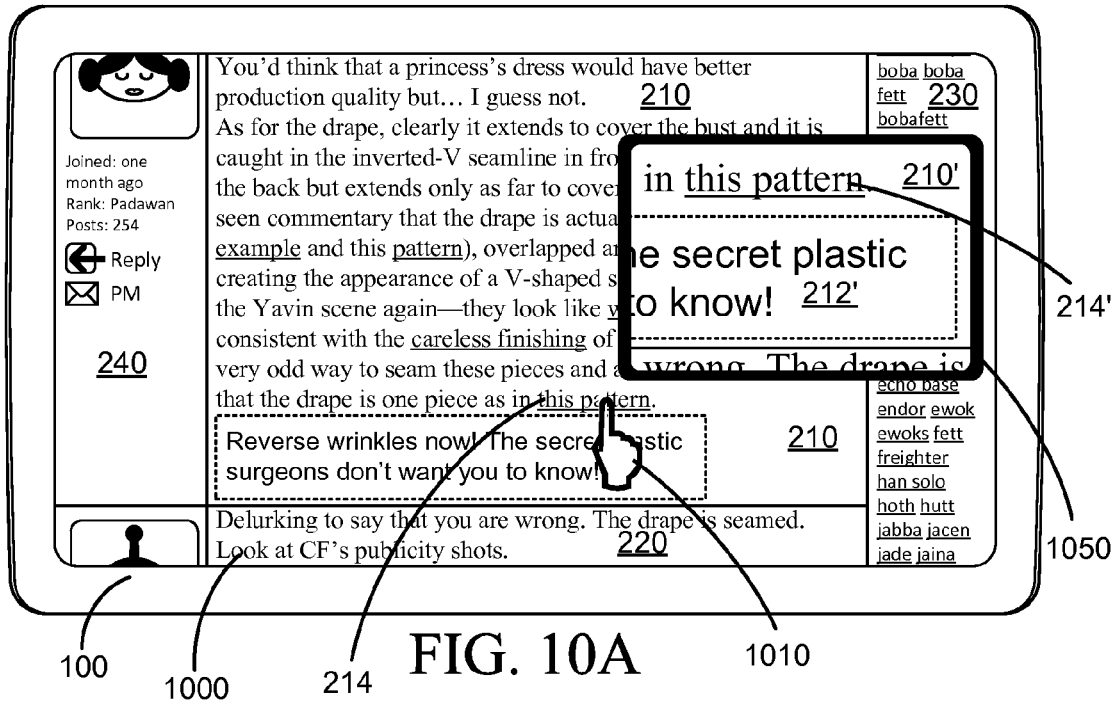
FIGS. 10A and 10B are illustrations of further examples of enhanced views of the webpage of FIG. 2 in a further implementation using a pointing input device.
Figure 10B:
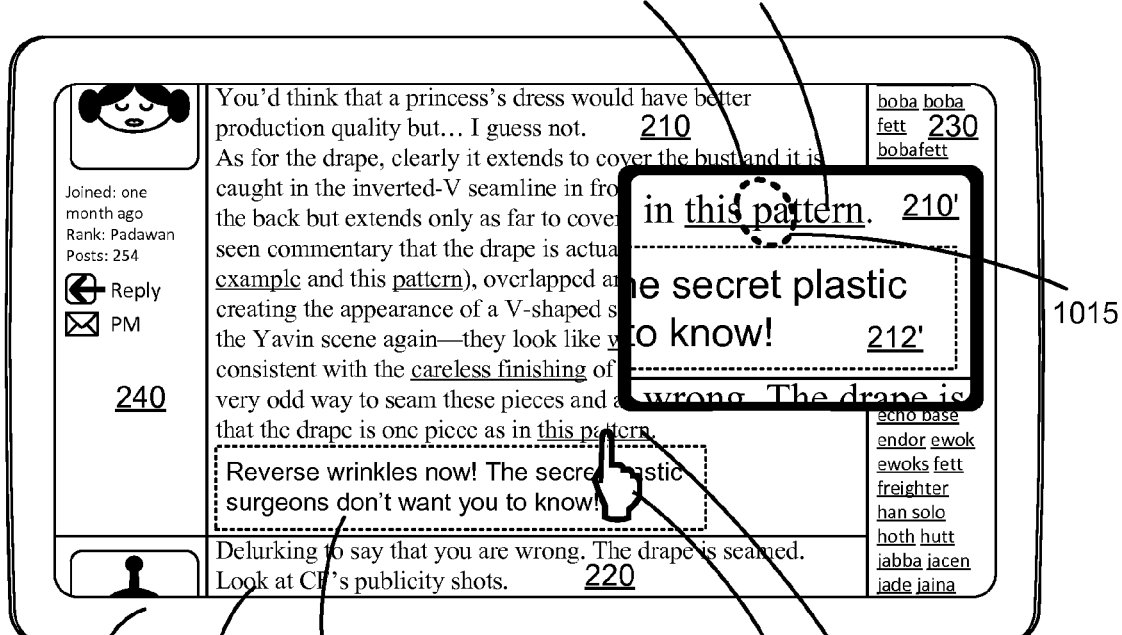

FIGS. 10A and 10B illustrate yet another implementation where the inputs received by the electronic device 100 are a combination of both pointing device and touch input, as may be the case where the electronic device 100 is equipped with both a pointing input device and a touchscreen as well—for instance, there may be an integrated touchscreen, but also a smaller trackpad or trackball integrated within the electronic device 100 as well. FIG. 10A is similar to FIG. 8A, in that the rendered webpage is shown in the first view 1000 just as the first view 800 of FIG. 8A, and the pointer icon 1010 is, in this example, in the same position as the pointer icon 810a. Just as in FIG. 8A, the position of the pointer icon 810a in this location results in invocation of the second view of the enlarged region of the document 1050, since the position is proximate to more than one interactive element in the second, enhanced view 1050. In this example, no particular interactive element is shown as potentially selected in the second view 1050.

Also as in FIG. 8B, the position of the pointing icon 1010 may be moved, and the displayed document region in the second view 1050 can be updated accordingly. In addition, however, since the display is a touchscreen display, the user can initiate a concurrent touch in the second view 1050 as indicated by contact region 1015 in FIG. 10B. When the touch point determined from this contact region 1015 corresponds to one interactive element shown in the enhanced view, in this case element 214', this touch is processed as a touch event for the interactive element 214 as originally displayed in the first view 1000.

Figure 11:
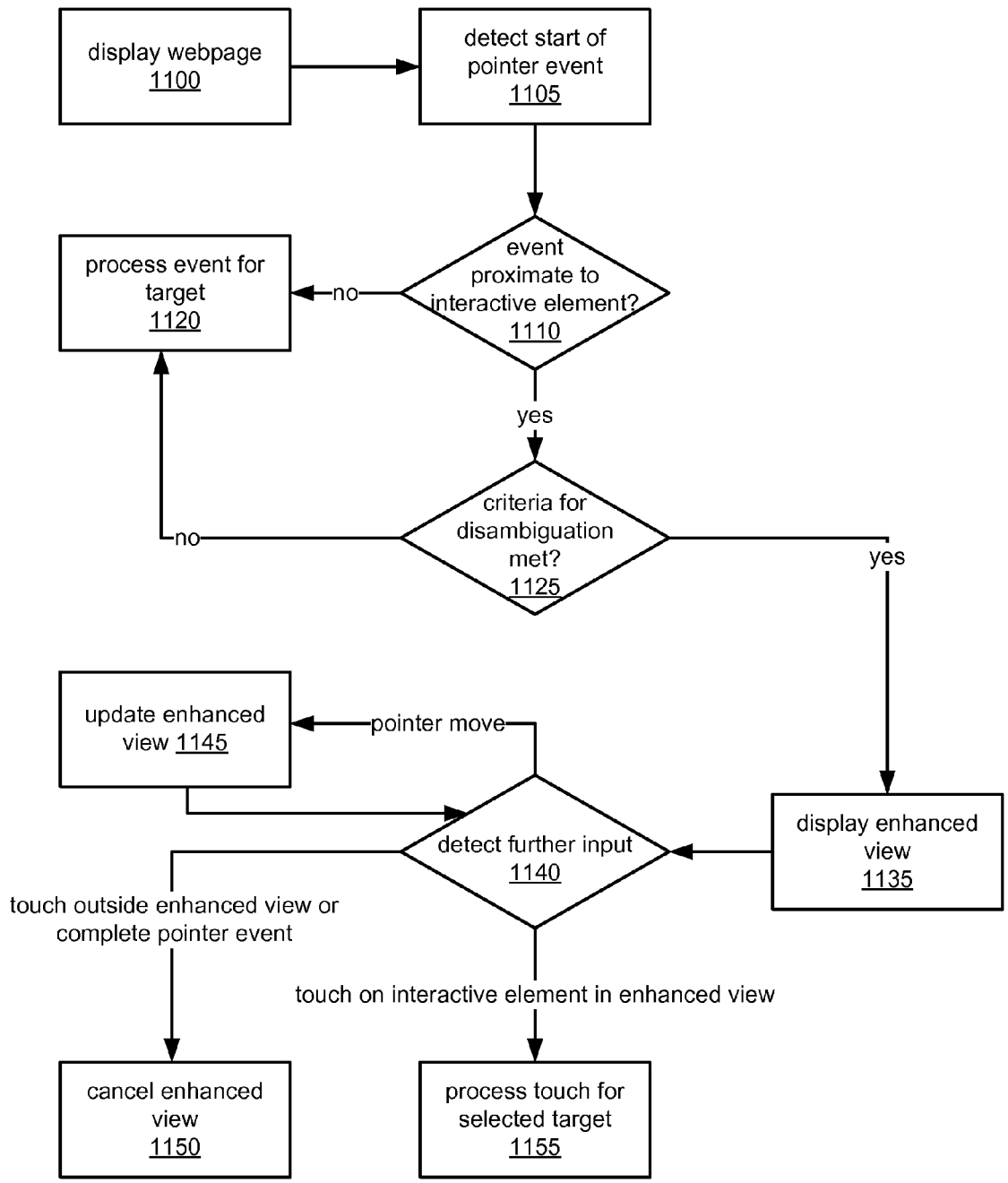
FIG. 11 is flowchart for an example method implementing the enhanced view examples of FIGS. 10A and 10B.

FIG. 11 illustrates an example method for use in the combination pointer-touch input implementation of FIGS. 10A and 10B. At 1000, the document, such as a webpage, is displayed in a first view. At 1105 the start of a pointer event is detected, defining the initial position of the pointer event in the first view. At 1110 it is determined whether the position is proximate to an interactive element, in a manner similar to that described above. If the position is not proximate to an interactive element then the pointer event continues to be processed for the target that is indicated by the current position at 1120. If the position is proximate to an interactive element, then it is next determined at 1125 whether the criteria for disambiguation have been met. If the criteria have not been met then the process continues to 1120. If the criteria have been met, then the second view is displayed at 1135, as before. At 1140, further input is detected. If the detected further input is movement the pointer icon to a new position, then the second view is updated at 1145, as above. An event such as a touch detected outside the second view 1050 (somewhere in the first view 1000, for example) or a completion of the pointer event, such as release of the mouse button or trackball, results in cancellation of the second view 1150 and no interaction function in response. However, if a touch is detected on an interactive element within the second view 1050, then this touch is processed as though it had been located in the first view over the corresponding element in the first view at 1155, and an interaction function is invoked for that interactive element. Again, the second view 1050 can be dismissed at this point.

Figure 12A:
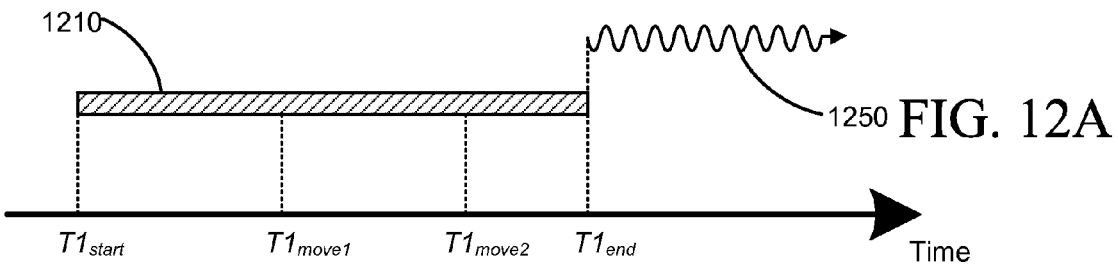
FIGS. 12A to 12D are example timing diagrams for various implementations described herein.

FIGS. 12A to 12D illustrate schematically the order in which touch or pointer inputs are detected and the point at which an interaction function for a selected interactive element is invoked for the various examples described above. In each of these examples, the process ends with successful invocation of an interaction function for a single selected interactive element. FIG. 12A illustrates a possible timing diagram for the example of FIGS. 3A to 5, where only a single touch input is used to select a displayed interactive element. At $T1_{start}$, the starting touch input (e.g., a touch down, or beginning of contact) is detected in the first view displaying the document at the initial scale, at the initial touch point position. The bar 1210 illustrates the duration of the contact initiated at $T1_{start}$. Optionally at $T1_{move1}$ and $T1_{move2}$, movement of the touch point due to a moving touch input is detected; this may not occur at all in some cases, and in others, more than two instances of movement may be detected. The contact ends at $T1_{end}$ with an ending touch input, at which point a process 1250, which is the interaction function associated with the selected interactive element, is launched in response to the detection of the end of the contact at $T1_{end}$. The selected interactive element is the element that coincides with the position of the touch point as of $T1_{start}$. Although in these examples the process 1250 is shown as starting immediately after $T1_{end}$, it will be appreciated by those skilled in the art that some delay (which may be on the order of microseconds or milliseconds) may be included.

Figure 12B:
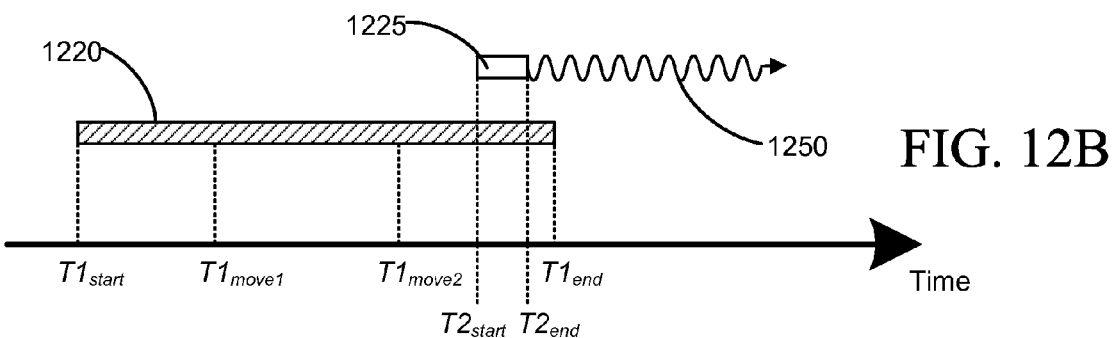

FIG. 12B illustrates the multitouch example of FIGS. 6A to 7. At $T1_{start}$, the starting touch input initiates contact at the initial touch point position in the first view. The duration of this contact in the first view is indicated by the bar 1220. Again, there may be moving touch input moving the touch point in the first view at zero, one or more instances indicated by $T1_{move1}$ and $T1_{move2}$. At some point during contact 1220, a second touch 1225 is initiated at time $T2_{start}$. This touch can be of shorter duration, ending at $T2_{end}$, which occurs before $T1_{end}$ in this example (in other examples $T1_{end}$ may occur before $T2_{end}$). It is this second contact 1220 that triggers the start of the interaction process 1250. In FIG. 12B process 1250 is shown as beginning with the end of the touch 1225, but it may commence before $T2_{end}$. In this example, however, the end of the first contact 1220 at $T1_{end}$ does not determine the start of the process 1250. The interactive element that is the subject of the interaction process 1250 in this multitouch example is the interactive element selected by the second touch 1225.

Figure 12C:
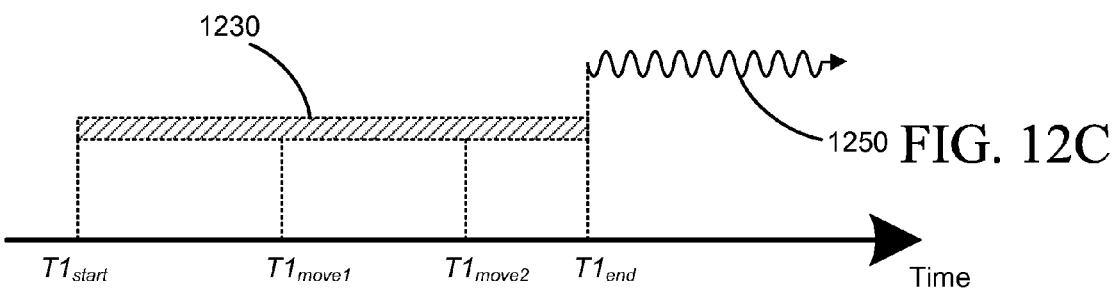

FIG. 12C illustrates the pointing input example of FIGS. 8A to 9. In this case, bar 1230 represents the duration of the pointing event, which can start with a mouse down (click and hold) at time $T1_{start}$ and ends at $T1_{end}$. Again, zero, one or more move inputs, represented by $T1_{move1}$ and $T1_{move2}$, may occur during the event duration 1230. Upon the end of the event at $T1_{end}$, the process 1250 is launched for the interactive element identified by the pointing input as of time $T1_{end}$.

Figure 12D:
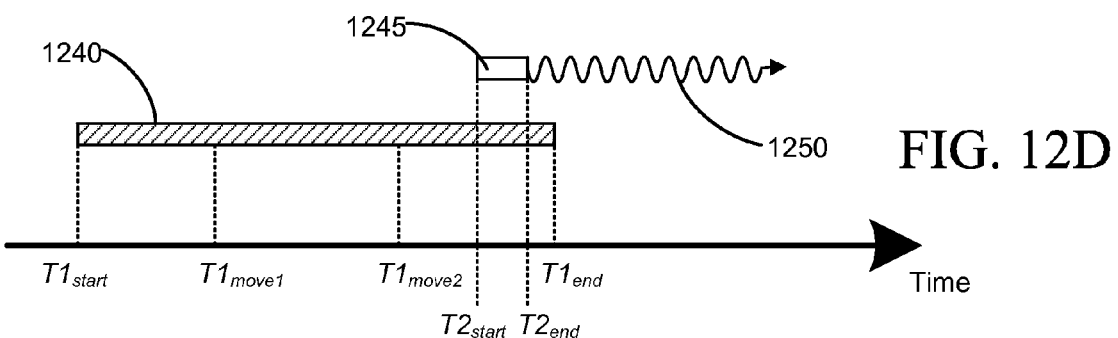

Finally, FIG. 12D illustrates the combination pointing input and touch input example of FIGS. 10A to 11. Times $T1_{start}$, $T1_{move1}$, $T1_{move2}$, and $T1_{end}$ are the same as in the example of FIG. 12C, and the duration of the pointing event is illustrated by bar 1240. A concurrent touch is detected for a shorter duration 1245 between $T2_{start}$ and $T2_{end}$, while the pointing event 1240 is ongoing. This touch triggers the start of the interaction process 1250. As with FIG. 12B, process 1250 is shown as beginning with the end of the touch 1225, but it may commence before $T2_{end}$. The interactive element that is the subject of the interaction process 1250 is the interactive element selected by the touch 1245.

Thus, according to the embodiments and examples herein, there is provided a method, comprising: displaying a document at an initial scale in a first view on a touchscreen display, the document comprising a plurality of interactive elements; detecting a starting touch input initiating a first contact on the touchscreen display at a first touch point, the first touch point having an initial position within the first view; determining whether the initial position is within a disambiguation region for the plurality of interactive elements; when the initial position is determined to be within the disambiguation region: while the first contact is maintained on the touchscreen display, displaying a region of the document at an enlarged scale in a second view, the region initially being defined by the initial position and including the plurality of interactive elements; and detecting an ending touch input for the first contact, the ending touch input comprising a selection of one interactive element included in the region, a location of the ending touch input identifying the selected interactive element; and in response to the ending touch input, automatically initiating an interaction function with the selected interactive element.

In one aspect, when the initial position is determined to be within the disambiguation region, the method further comprises: while the first contact is maintained on the touchscreen display, detecting a moving touch input within the first view indicating movement of the first touch point from the initial position to a final position, wherein the ending touch input is detected at the final position, and the ending touch input ends the first contact on the touchscreen display, the selected interactive element being identified as one of the plurality of interactive elements corresponding to the final position.

In another aspect, the starting touch input comprises a touch start, the moving touch input comprises a touch move, and the ending touch input comprises a touch end.

In a further aspect, displaying the region of the document in the second view comprises updating the second view as a position of the first touch point changes during detection of the moving touch input, the second view thus comprising a region of the document defined by a current position of the first touch point within the first view, and including any of the plurality of interactive elements included in the region thus defined.

Still further, the method may comprise, as a position of the first touch point changes during detection of the moving touch input, determining whether a current position of the first touch point identifies one interactive element included in the region; and when the current position of the first touch point identifies the one interactive element, indicating in the second view that the one interactive element will be selected.

In yet another aspect, the ending touch input comprises a further touch input initiating a further contact on the touchscreen display at second touch point within the second view detected while the first contact is maintained on the touchscreen display, the location of the ending touch input being a position of the second touch point, the method further comprising identifying the selected interactive element by identifying one of the plurality of interactive elements displayed at the position of the second touch point.

Still further, when the initial position is determined to be within the disambiguation region, the method may further comprise: while the first contact is maintained on the touchscreen display, detecting a moving touch input within the first view indicating movement of the first touch point from the initial position to a further position; and displaying the region of the document in the second view comprises updating the second view as a position of the first touch point changes during detection of the moving touch input, the second view thus comprising a region of the document defined by a current position of the first touch point within the first view, and including any of the plurality of interactive elements included in the region thus defined.

Further, the interaction function may comprise initiating a request over a network for a resource identified by the selected interactive element; the document may comprise a webpage and the plurality of interactive elements comprise hyperlinks; and/or the disambiguation region for each one of the plurality of interactive elements comprises an area defined around each of said interactive elements, such that the initial position is determined to be within the disambiguation region for the plurality of interactive elements when the initial position is located within the area defined for at least two of the plurality of interactive elements.

In another aspect, the second view overlays at least a portion of first view, or alternatively is displayed adjacent to the first view.

Still further, when the initial position is determined to not be within the disambiguation region, the starting touch input may be processed in accordance with a default process.

In yet another aspect, detecting the starting touch input may comprise: detecting commencement of the starting touch input; and determining that a duration of the first contact is at least a defined minimum, wherein when the duration of the first contact is less than the defined minimum, the starting touch input is processed in accordance with a default process.

Still further, there is provided a method, comprising: displaying a document at an initial scale in a first view on a touchscreen display, the document comprising a plurality of interactive elements; detecting a starting touch input initiating a contact on the touchscreen display at a touch point, the touch point having an initial position within the first view; determining whether the initial position is within a disambiguation region for the plurality of interactive elements; when the initial position is determined to be within the disambiguation region: while the contact is maintained on the touchscreen display, displaying a region of the document at an enlarged scale in a second view, the region initially being defined by the initial position and including the plurality of interactive elements; detecting a moving touch input within the first view indicating movement of the touch point from the initial position to a final position; and detecting an ending touch input at the final position, the ending touch input ending the contact on the touchscreen display; and in response to the ending touch input, identifying one of the plurality of interactive elements corresponding to the final position, and automatically initiating an interaction function with the identified one of the plurality of interactive elements.

In one aspect of this method, displaying the region of the document in the second view comprises updating the second view as a position of the touch point changes during detection of the moving touch input, the second view thus comprising a region of the document defined by a current position of the touch point within the first view, and including any of the plurality of interactive elements included in the region thus defined.

In another aspect, the method further comprises, as a position of the touch point changes during detection of the moving touch input, determining whether a current position of the touch point corresponds to one interactive element included in the region; and when the current position of the touch point identifies the one interactive element, visually indicating the identified interactive element in the second view.

Still further, the interaction function may comprise initiating a request over a network for a resource identified by the selected interactive element; the disambiguation region for each one of the plurality of interactive elements may comprise an area defined around each of said interactive elements, such that the initial position is determined to be within the disambiguation region for the plurality of interactive elements when the initial position is located within the area defined for at least two of the plurality of interactive elements; the second view may overlay at least a portion of the first view or be adjacent the first view; and/or the method may further comprise, when the initial position is determined to not be within the disambiguation region, processing the starting touch input in accordance with a default process.

There is also provided a method, comprising: displaying a document at an initial scale in a first view on a touchscreen display, the document comprising a plurality of interactive elements; detecting a starting touch input initiating a contact on the touchscreen display at a first touch point, the first touch point having an initial position within the first view; determining whether the initial position is within a disambiguation region for the plurality of interactive elements; when the initial position is determined to be within the disambiguation region: while the contact is maintained on the touchscreen display, displaying a region of the document at an enlarged scale in a second view, the region initially being defined by the initial position and including the plurality of interactive elements; and detecting a further touch input initiating a further contact on the touchscreen display at a second touch point within the second view, a position of the second touch point corresponding to one of the plurality of interactive elements displayed in the second view; and in response to the further touch input, selecting the corresponding one of the plurality of interactive elements, and automatically initiating an interaction function with the selected interactive element.

In one aspect, the method may further comprise, when the initial position is determined to be within the disambiguation region, while the contact is maintained: detecting a moving touch input within the first view indicating movement of the first touch point from the initial position to a further position; and updating the second view as a position of the first touch point changes during detection of the moving touch input, the second view thus comprising a region of the document defined by a current position of the first touch point within the first view, and including any of the plurality of interactive elements included in the region thus defined.

In another aspect, the interaction function may comprise initiating a request over a network for a resource identified by the selected interactive element; the disambiguation region for each one of the plurality of interactive elements may comprise an area defined around each of said interactive elements, such that the initial position is determined to be within the disambiguation region for the plurality of interactive elements when the initial position is located within the area defined for at least two of the plurality of interactive elements; the second view may overlay at least a portion of the first view or be adjacent the first view; and/or the method may comprise, when the initial position is determined to not be within the disambiguation region, processing the starting touch input in accordance with a default process.

There is also provided an electronic device, which may comprise some or all of the features described herein such as a touchscreen display and a processor, which is adapted to implement the methods and variations described above.

There is further provided an electronic device-readable medium, which may be physical or non-transitory, bearing code which, when executed by a suitable electronic device, causes the device to implement the methods and variations described herein.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments described herein, as would be understood by the person skilled in the art. For example, from the description above it will be appreciated by those skilled in the art that these examples and embodiments can be applied, with suitable modifications, to other types of content rather than only webpages or similar documents. Thus, strict adherence to XML or XML-like standards in defining the document (such as HTML), as might be used in the webpage and structured document examples given above, is not mandatory for implementing these examples.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method, comprising:
   displaying a document at an initial scale in a first view on a touchscreen display, the document comprising a plurality of interactive elements;

detecting a starting touch input initiating a contact on the touchscreen display at a first touch point, the first touch point having an initial position within the first view;

determining whether the initial position is within a disambiguation region for two or more of the plurality of interactive elements, wherein a disambiguation area for an interactive element comprises an area defined by a disambiguation boundary around the interactive element and represents a specified distance beyond bounds of the interactive element, such that the initial position is determined to be within the disambiguation region for the two or more interactive elements when the initial position is located within disambiguation areas for at least two of the two or more interactive elements;

when the initial position is determined to be within the disambiguation region for the two or more interactive elements:

while the contact is maintained on the touchscreen display, displaying a region of the document comprising the initial position at an enlarged scale in a pop-up which partially overlays the first view, the two or more interactive elements being displayed at the enlarged scale in the pop-up;

detecting a further touch input in the pop-up for selecting one of the two or more enlarged interactive elements; and in response to the further touch input, automatically initiating an interaction function with the selected interactive element.

2. The method of claim 1, further comprising, when the initial position is determined to be within the disambiguation region of the two or more interactive elements, while the contact is maintained:

detecting a moving touch input within the first view indicating movement of the first touch point from the initial position to a further position; and updating the pop-up as a position of the first touch point changes during detection of the moving touch input, the pop-up thus comprising a region of the document defined by a current position of the first touch point within the first view, and including any of the plurality of interactive elements included in the region thus defined.

3. The method of claim 1, wherein the interaction function comprises initiating a request over a network for a resource identified by the selected interactive element.

4. The method of claim 1, further comprising, when the initial position is determined to not be within the disambiguation region of the two or more interactive elements, processing the starting touch input in accordance with a default process.

5. The method of claim 1, wherein the touchscreen display is multitouch-enabled.

6. The method of claim 1, wherein detecting the further touch input comprises detecting a contact region in the pop-up which intersects the one of the two or more enlarged interactive elements.

7. An electronic device, including:
a touchscreen display; and
a processor in communication with the touchscreen display, the processor being configured to be capable of:
displaying a document at an initial scale in a first view on a touchscreen display, the document comprising a plurality of interactive elements;

detecting a starting touch input initiating a contact on the touchscreen display at a first touch point, the first touch point having an initial position within the first view;

determining whether the initial position is within a disambiguation region for two or more of the plurality of interactive elements, wherein a disambiguation area for an interactive element comprises an area defined by a disambiguation boundary around the interactive element and represents a specified distance beyond bounds of the interactive element, such that the initial position is determined to be within the disambiguation region for the two or more interactive elements when the initial position is located within disambiguation areas for at least two of the two or more interactive elements;

when the initial position is determined to be within the disambiguation region for the two or more interactive elements:

while the contact is maintained on the touchscreen display, displaying a region of the document comprising the initial position at an enlarged scale in a pop-up which partially overlays the first view, the two or more interactive elements being displayed at the enlarged scale in the pop-up;

detecting a further touch input in the pop-up for selecting one of the two or more enlarged interactive elements; and in response to the further touch input, automatically initiating an interaction function with the selected interactive element.

8. The electronic device of claim 7, wherein the processor is further capable of, when the initial position is determined to be within the disambiguation region of the two or more interactive elements, while the contact is maintained:

detecting a moving touch input within the first view indicating movement of the first touch point from the initial position to a further position; and updating the pop-up as a position of the first touch point changes during detection of the moving touch input, the pop-up thus comprising a region of the document defined by a current position of the first touch point within the first view, and including any of the plurality of interactive elements included in the region thus defined.

9. The electronic device of claim 7, wherein the interaction function comprises initiating a request over a network for a resource identified by the selected interactive element.

10. The electronic device of claim 7, wherein the processor is further capable of, when the initial position is determined to not be within the disambiguation region of the two or more interactive elements, processing the starting touch input in accordance with a default process.

11. The electronic device of claim 7, wherein the touchscreen display is multitouch-enabled.

12. The electronic device of claim 7, wherein detecting the further touch input comprises detecting a contact region in the pop-up which intersects the one of the two or more enlarged interactive elements.

13. A non-transitory electronic device-readable medium bearing code which, when executed by one or more processors of an electronic device, causes the electronic device to implement the method of:

displaying a document at an initial scale in a first view on a touchscreen display, the document comprising a plurality of interactive elements;

detecting a starting touch input initiating a contact on the touchscreen display at a first touch point, the first touch point having an initial position within the first view;

determining whether the initial position is within a disambiguation region for two or more of the plurality of interactive elements, wherein a disambiguation area for an interactive element comprises an area defined by a disambiguation boundary around the interactive element and represents a specified distance beyond bounds of the interactive element, such that the initial position is determined to be within the disambiguation region for the two or more interactive elements when the initial position is located within disambiguation areas for at least two of the two or more interactive elements;

when the initial position is determined to be within the disambiguation region for the two or more interactive elements:

while the contact is maintained on the touchscreen display, displaying a region of the document comprising the initial position at an enlarged scale in a pop-up which partially overlays the first view, the two or more interactive elements being displayed at the enlarged scale in the pop-up;

detecting a further touch input in the pop-up for selecting one of the two or more enlarged interactive elements; and in response to the further touch input, automatically initiating an interaction function with the selected interactive element.

14. The non-transitory electronic device-readable medium of claim 13, wherein the method further comprises, when the initial position is determined to be within the disambiguation region of the two or more interactive elements, while the contact is maintained:

detecting a moving touch input within the first view indicating movement of the first touch point from the initial position to a further position; and updating the pop-up as a position of the first touch point changes during detection of the moving touch input, the pop-up thus comprising a region of the document defined by a current position of the first touch point within the first view, and including any of the plurality of interactive elements included in the region thus defined.

15. The non-transitory electronic device-readable medium of claim 13, wherein the interaction function comprises initiating a request over a network for a resource identified by the selected interactive element.

16. The non-transitory electronic device-readable medium of claim 13, wherein the method further comprises, when the initial position is determined to not be within the disambiguation region of the two or more interactive elements, processing the starting touch input in accordance with a default process.

17. The non-transitory electronic device-readable medium of claim 13, wherein the touchscreen display is multitouch-enabled.

18. The non-transitory electronic device-readable medium of claim 13, wherein detecting the further touch input comprises detecting a contact region in the pop-up which intersects the one of the two or more enlarged interactive elements.

* * * * *